(12) United States Patent
Furuzawa

(10) Patent No.: US 9,200,391 B2
(45) Date of Patent: Dec. 1, 2015

(54) MAT, METHOD FOR MANUFACTURING THE MAT, AND APPARATUS FOR PURIFYING EXHAUST GAS

(75) Inventor: Hideki Furuzawa, Ogaki (JP)

(73) Assignee: IBIDEN CO., LTD., Ogaki-shi (JP)

( * ) Notice: Subject to any disclaimer, the term of this patent is extended or adjusted under 35 U.S.C. 154(b) by 507 days.

(21) Appl. No.: 13/076,440

(22) Filed: Mar. 31, 2011

(65) Prior Publication Data

US 2011/0239602 A1    Oct. 6, 2011

(30) Foreign Application Priority Data

Mar. 31, 2010  (JP) ................. 2010-083770

(51) Int. Cl.
*B01D 39/00* (2006.01)
*D04H 1/4209* (2012.01)
*C04B 35/622* (2006.01)
(Continued)

(52) U.S. Cl.
CPC ........ *D04H 1/4209* (2013.01); *C04B 35/62245* (2013.01); *C04B 35/6303* (2013.01); *D04H 1/4218* (2013.01); *D04H 1/46* (2013.01); *D04H 1/64* (2013.01); *D04H 1/74* (2013.01); *D04H 3/002* (2013.01); *D04H 3/004* (2013.01); *D04H 3/04* (2013.01); *D04H 3/12* (2013.01); *C04B 2235/3217* (2013.01); *C04B 2235/3218* (2013.01); *C04B 2235/444* (2013.01); *C04B 2235/526* (2013.01); *C04B 2235/5256* (2013.01); *C04B 2235/5264* (2013.01); *F01N 3/2853* (2013.01); *Y10T 428/24132* (2015.01)

(58) Field of Classification Search
CPC .. B01D 50/00; C04B 33/32; C04B 35/62245; C04B 35/6303; C04B 2235/3217; C04B 2235/3218; C04B 2235/444; C04B 2235/5256; C04B 2235/526; C04B 2235/5264; D04H 1/4209; D04H 1/4218; D04H 1/46; D04H 1/64; D04H 1/74; D04H 3/002; D04H 3/004; D04H 3/04; D04H 3/12; D04H 13/00; F01N 3/2853–3/2871; Y10T 428/24132
USPC ................. 442/270–275, 368, 383, 387–388, 442/402–407; 55/523, 490; 428/114, 144; 264/628
See application file for complete search history.

(56) References Cited

U.S. PATENT DOCUMENTS 4,158,557 A * 6/1979 Drummond ..................... 65/382
4,335,176 A * 6/1982 Baumann ...................... 442/388
(Continued)

FOREIGN PATENT DOCUMENTS

CN    1437677    8/2003
CN    1749538    3/2006
(Continued)

OTHER PUBLICATIONS

Extended European Search Report for corresponding EP Application No. 11159542.7-2124, May 25, 2011.

*Primary Examiner* — Thomas McKenzie
(74) *Attorney, Agent, or Firm* — Mori & Ward, LLP

(57) ABSTRACT

A mat includes a first principal face, a second principal face opposite to the first principal face, entangled points, and unentangled portions. The entangled points are provided by entangling inorganic fibers with one another. The unentangled portions are provided from the first principal face to the second principal face. The inorganic fibers are not entangled with one another and are arranged substantially parallel to one another in said unentangled portions.

10 Claims, 12 Drawing Sheets

(51) Int. Cl.

| | | |
|---|---|---|
| *C04B 35/63* | (2006.01) | |
| *D04H 1/4218* | (2012.01) | |
| *D04H 1/46* | (2012.01) | |
| *D04H 1/64* | (2012.01) | |
| *D04H 1/74* | (2006.01) | |
| *D04H 3/002* | (2012.01) | |
| *D04H 3/004* | (2012.01) | |
| *D04H 3/04* | (2012.01) | |
| *D04H 3/12* | (2006.01) | |
| *F01N 3/28* | (2006.01) | |

(56) References Cited

U.S. PATENT DOCUMENTS

| | | | |
|---|---|---|---|
| 4,522,876 A * | 6/1985 | Hiers | 442/388 |
| 4,885,205 A | 12/1989 | Wahl et al. | |
| 5,948,257 A * | 9/1999 | Custer et al. | 210/500.26 |
| 6,312,490 B1 * | 11/2001 | Lippert et al. | 55/482 |
| 2004/0224589 A1 * | 11/2004 | Bacon et al. | B29C 70/24 442/168 |
| 2007/0107394 A1 * | 5/2007 | Jankowski | 55/523 |
| 2009/0087352 A1 | 4/2009 | Okabe | |
| 2009/0304560 A1 * | 12/2009 | Dietz | 422/179 |
| 2010/0196218 A1 * | 8/2010 | Schildermans et al. | 422/168 |
| 2011/0023430 A1 * | 2/2011 | Kumar et al. | 55/486 |

FOREIGN PATENT DOCUMENTS

| | | |
|---|---|---|
| CN | 101397928 | 4/2009 |
| EP | 280340 A1 * | 8/1988 |
| EP | 2042634 | 4/2009 |
| FR | 2885621 | 11/2006 |
| JP | 62-056348 | 3/1987 |
| JP | 09-000946 | 1/1997 |
| JP | 11-302955 | 11/1999 |

\* cited by examiner

A-A line cross-sectional view

B-B line cross-sectional view

C-C line cross-sectional view

D-D line cross-sectional view

MAT, METHOD FOR MANUFACTURING THE MAT, AND APPARATUS FOR PURIFYING EXHAUST GAS

CROSS-REFERENCE TO RELATED APPLICATIONS

The present application claims priority under 35 U.S.C. §119 to Japanese Patent Application No. 2010-083770, filed on Mar. 31, 2010, the contents of which are incorporated herein by reference in their entirety.

BACKGROUND OF THE INVENTION

1. Field of the Invention

The present invention relates to a mat, a method for manufacturing the mat, and an apparatus for purifying exhaust gas.

2. Discussion of the Background

Conventionally, a non-woven mat formed by laminating inorganic fibers such as silica and alumina fibers has been known, and has been used for various applications since the mat is superior in characteristics such as heat resistance and elasticity (repulsive force).

For example, the mat is used as a member forming the apparatus for purifying exhaust gas.

As specifically described, the general apparatus for purifying exhaust gas includes an exhaust gas treating body, a casing housing the exhaust gas treating body, and a holding sealing material placed between the exhaust gas treating body and the casing. The above-mentioned mat is used as a member forming the holding sealing material. The holding sealing material is manufactured through a process of cutting the mat into a predetermined shape, and the like.

A holding sealing material made of a non-woven mat having a repulsive force has a predetermined holding force. For this reason, in the apparatus for purifying exhaust gas, the holding sealing material tightly holds the exhaust gas treating body at a predetermined position in the casing. Since the holding sealing material is placed between the exhaust gas treating body and the casing, if vibration or the like, is caused, the exhaust gas treating body is less likely to come into contact with the casing, and exhaust gases are less likely to leak from between the exhaust gas treating body and the casing.

Herein, examples of a method for manufacturing the apparatus for purifying exhaust gas using the holding sealing material include, for example, a method for stuffing the exhaust gas treating body wrapped with the holding sealing material into the casing.

To make it easy to stuff the exhaust gas treating body into the casing in the manufacturing method, it is necessary to moderately reduce the bulkiness of the holding sealing material wrapped around the exhaust gas treating body.

As a mat used for the holding sealing material, JP-A 9-946 discloses a binder mat manufactured by impregnating a mat made of alumina fibers with an organic binder solution, and then drying the mat with hot air in a compression state.

The manufactured binder mat is cut into a predetermined shape to manufacture a holding sealing material.

JP-A 62-56348 discloses a mat made of alumina fibers.

The mat made of alumina fibers is manufactured by carrying out barb needling, in which barb needles having a plurality of barbs are inserted into and drawn from a precursor sheet formed by compressing unfired alumina fiber precursors in the thickness direction of the precursor sheet, to manufacture a needling precursor sheet having entangled portions, and firing the manufactured needling precursor sheet.

The manufactured mat is cut into a predetermined shape to manufacture a holding sealing material.

In the conventional binder mat described in JP-A 9-946, since inorganic fibers forming the binder mat are bonded to one another by an organic binder, the bulkiness of the binder mat is reduced.

Accordingly, it is believed that the bulkiness of the holding sealing material manufactured by cutting the conventional binder mat into a predetermined shape also reduces, and an exhaust gas treating body wrapped with the holding sealing material is more likely to be stuffed into a casing.

Further, it is believed that, during use of an apparatus for purifying exhaust gas, the organic binder is thermally decomposed by high-temperature exhaust gases to reconstruct the shape of the holding sealing material, and the exhaust gas treating body can be held well.

However, in the case where the conventional binder mat described in JP-A 9-946 is manufactured, due to good water-absorbing property and low air permeability of the non-woven mat, much time is required to volatilize a dispersion medium or solvent of an organic binder solution with dry air in a drying process, causing problems of the reduced manufacturing efficiency and the increased manufacturing cost of the binder mat.

In contrast, in the conventional mat described in JP-A 62-56348, since inorganic fibers are complicatedly entangled at a portion from and into which barb needle is drawn and inserted (entangled portion) along the thickness direction of the mat, the bulkiness of the mat is reduced around the entangled portion.

Accordingly, it is believed that the bulkiness of the holding sealing material manufactured by cutting the conventional mat into a predetermined shape is also reduced, and the exhaust gas treating body wrapped with the holding sealing material is more likely to be stuffed into the casing.

However, an increase in the bulkiness of the conventional mat described in JP-A 62-56348 is not sufficiently suppressed.

Therefore, the inventors of the present invention have applied the technology described in JP-A 9-946, impregnated the mat described in JP-A 62-56348 with an organic binder solution, and dried the mat with dry air to manufacture a binder mat. In this case, as is the case of manufacturing the conventional binder mat described in JP-A 9-946, the inventors have found that, due to good water-absorbing property and low air permeability of the non-woven mat, much time is required to dry the mat, causing problems of the reduced manufacturing efficiency and the increased manufacturing cost of the mat.

The contents of JP-A 9-946 and JP-A 62-56348 are incorporated herein by reference in their entirety.

SUMMARY OF THE INVENTION

According to one aspect of the present invention, a mat includes a first principal face, a second principal face opposite to the first principal face, entangled points, and unentangled portions. The entangled points are provided by entangling inorganic fibers with one another. The unentangled portions are provided from the first principal face to the second principal face. The inorganic fibers are not entangled with one another and are arranged substantially parallel to one another in the unentangled portions.

According to another aspect of the present invention, a method for manufacturing a mat includes providing entangled points by entangling inorganic fibers with one another. Barbless needles are penetrated to a first sheet including the entangled points from at least a first principal face side of the first sheet to a second principal face side.

According to further aspect of the present invention, an apparatus for purifying exhaust gas includes an exhaust gas treating body, a casing, and a holding sealing material. The casing houses the exhaust gas treating body. The holding sealing material is placed between the exhaust gas treating body and the casing. The holding sealing material uses the above-mentioned mat.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
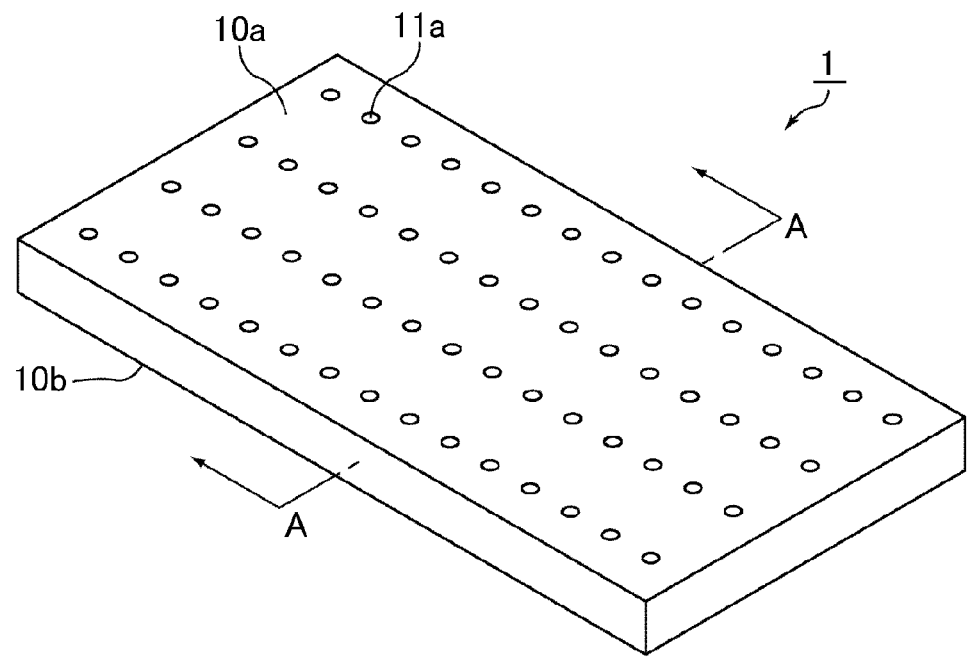
FIG. 1A is a perspective view which schematically shows the mat according to an embodiment of a first aspect of the present invention.

The embodiments will now be described with reference to the accompanying drawings, wherein like reference numerals designate corresponding or identical elements throughout the various drawings.

The mat according to the embodiment of the first aspect of the present invention is a mat including entangled points formed by entangling inorganic fibers with one another, the mat including unentangled portions which are provided from one of its principal faces to the other principal face, and in which the fibers are not entangled with one another and are arranged parallel to one another.

In the case where the mat according to the embodiment of the first aspect of the present invention is impregnated with an organic binder solution to manufacture an impregnated mat, and the impregnated mat is dried with dry air or the like, to manufacture a binder mat, the drying time tends to be greatly reduced. This makes it easier to increase the manufacturing efficiency of the binder mat and keep down the manufacturing cost.

Therefore, in the case where a holding sealing material is manufactured by cutting the binder mat into a predetermined shape or the like, the cost tends to be kept down.

Referring to the Figures, the following description will discuss this.

Figure 1B:
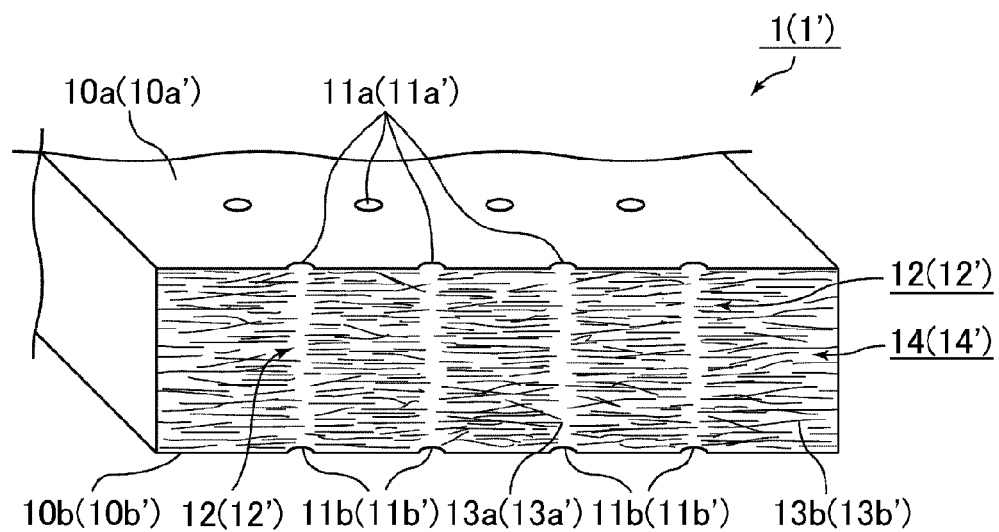
FIG. 1B is an A-A line cross-sectional view of the mat shown in FIG. 1A.

FIG. 1A is a perspective view which schematically shows the mat according to an embodiment of the first aspect of the present invention. FIG. 1B is an A-A line cross-sectional view of the mat shown in FIG. 1A.

The shape of a mat 1 according to an embodiment of the first aspect of the present invention shown in FIG. 1A is a flat plate shape with a predetermined thickness that is formed into a substantially rectangular shape in the plan view. With respect to the other structure of the mat 1, the explanation thereof will be given later in the description of a first embodiment of the present invention. The following description will mainly discuss the detailed structure of the inside of the mat 1 according to an embodiment of the first aspect of the present invention.

The mat 1 according to the embodiment of the first aspect of the present invention shown in FIGS. 1A and 1B includes entangled points formed by entangling inorganic fibers with one another (hereinafter, the mat including entangled points formed by entangling inorganic fibers with one another is also simply referred to as a mat containing inorganic fibers).

The mat 1 according to the embodiment of the first aspect of the present invention has one of its principal faces (hereinafter, referred to as a first principal face) 10a, and the other principal face (hereinafter, referred to as a second principal face) 10b opposite to the first principal face 10a.

Barbless needle through points (hereinafter, referred to as first barbless needle through points) 11a are formed on portions on the first principal face 10a where barbless needles penetrate in barbless needling described later, and the other barbless needle through points (hereinafter, referred to as second barbless needle through points) 11b are formed on the second principal face 10b.

Unentangled portions 12 are provided from the first barbless needle through points 11a to the second barbless needle through points 11b along the thickness direction of the mat 1.

As shown in FIG. 1B, entangled points (unformed region) 14 other than the unentangled portions 12 are formed by loosely entangling inorganic fibers 13b with one another and have a non-woven shape.

In contrast, in the unentangled portions 12 provided from the first barbless needle through points 11a to the second barbless needle through points 11b, inorganic fibers 13a which are not entangled with one another and are arranged parallel to one another are present. For this reason, the unentangled portion 12 has a function of a venting hole which penetrates from the first barbless needle through point 11a to the second barbless needle through point 11b.

Accordingly, the mat 1 has higher air permeability than that of a mat in which the first barbless needle through points 11a, the second barbless needle through points 11b, and the unentangled portions 12 are not formed.

Since the inorganic fibers 13a which are not entangled with one another are present in the unentangled portion 12, even if a plurality of unentangled portions 12 are provided, the repulsive force of the mat 1 (holding force of the holding sealing material) are not reduced too much.

Here, in the present specification, the arrangement of fibers parallel to one another refers to the arrangement of most inorganic fibers forming an unentangled portion substantially parallel to one another. Specifically the arrangement of fibers parallel to one another refers to the uncrossed state of one optionally selected inorganic fiber with the other inorganic fiber adjacent to the inorganic fiber, or crossed state of one optionally selected inorganic fiber with the other inorganic fiber adjacent to the inorganic fiber at an angle of about 45° or less, among a plurality of inorganic fibers forming the unentangled portion when the mat has been cut substantially along the thickness direction and perpendicularly to the principal face so that the unentangled portions can be seen on a cut face, and the obtained cut face has been observed under a microscope or with the naked eye.

Further, since the first barbless needle through points 11a and the second barbless needle through points 11b are contained in the unentangled portion 12, inorganic fibers which are not entangled with one another and are arranged parallel to one another are present in the first barbless needle through points 11a and the second barbless needle through points 11b.

The following description will discuss the case where the mat 1 is impregnated with an organic binder solution to manufacture an impregnated mat, and the impregnated mat is dried with dry air to manufacture a mat containing an organic binder (hereinafter, simply referred to as a binder mat). Since the impregnated mat is the same as the mat 1 except that the organic binder solution is contained, the following description will be given with reference to FIG. 1B.

Since the mat 1 is non-woven and has good water-absorbing property, immediately after the impregnation of the organic binder solution, a large amount of organic binder solution is contained in an impregnated mat 1'.

However, since unentangled portions 12' which function as a venting hole, first barbless needle through points 11a', and second barbless needle through points 11b' are formed in the impregnated mat 1', an excess organic binder solution contained in the impregnated mat 1' is rapidly discharged outside through the unentangled portions 12', the first barbless needle through points 11a', and the second barbless needle through points 11b'. Further, when a solvent or dispersion medium in the organic binder solution is volatilized, it is more likely to be discharged to the outside of the impregnated mat 1' through the unentangled portions 12', the first barbless needle through points 11a', and the second barbless needle through points 11b'.

Moreover, when dry air is sprayed on the impregnated mat 1', the dry air, which flows from the first barbless needle penetrating points 11a' and the second barbless needle penetrating points 11b', passes through the unentangled portions 12', so that the dry air fully spreads inside of the impregnated mat 1' including entangled points (unformed region) 14'.

Accordingly, the impregnated mat 1' to be dried is dried in a short time. This makes it easier to increase the manufacturing efficiency of the binder mat and keep down the manufacturing cost.

The holding sealing material used in the apparatus for purifying exhaust gas can be processed by cutting the manufactured binder mat into a predetermined shape, if needed. Since the manufacturing cost of the binder mat as a raw material is low, the manufacturing cost of the holding sealing material also tends to be sufficiently kept down.

Further, in the binder mat, since inorganic fibers are bonded to one another by the organic binder, the bulkiness of the binder mat is moderately low. Therefore, the bulkiness of the holding sealing material using binder mat is also moderately low, and tends to be superior in stuffing property into a casing.

The mat according to the embodiment of the second aspect of the present invention is a mat including unentangled portions formed by allowing barbless needles to penetrate a sheet including the entangled points formed by entangling inorganic fibers with one another from at least one principal face side to the other principal face side.

Referring to the drawings, the following description will describe one example of barbless needling according to the embodiment of the second aspect of the present invention.

Figure 2A:
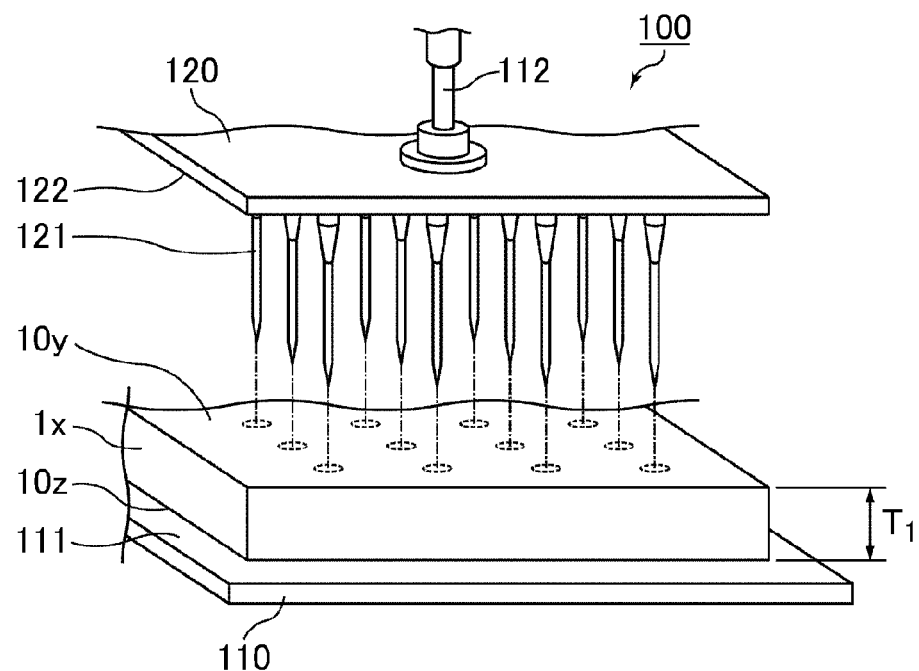
FIG. 2A is a perspective view which schematically shows a barbless needling device and a sheet used in barbless needling according to an embodiment of a second aspect of the present invention.
Figure 2B:
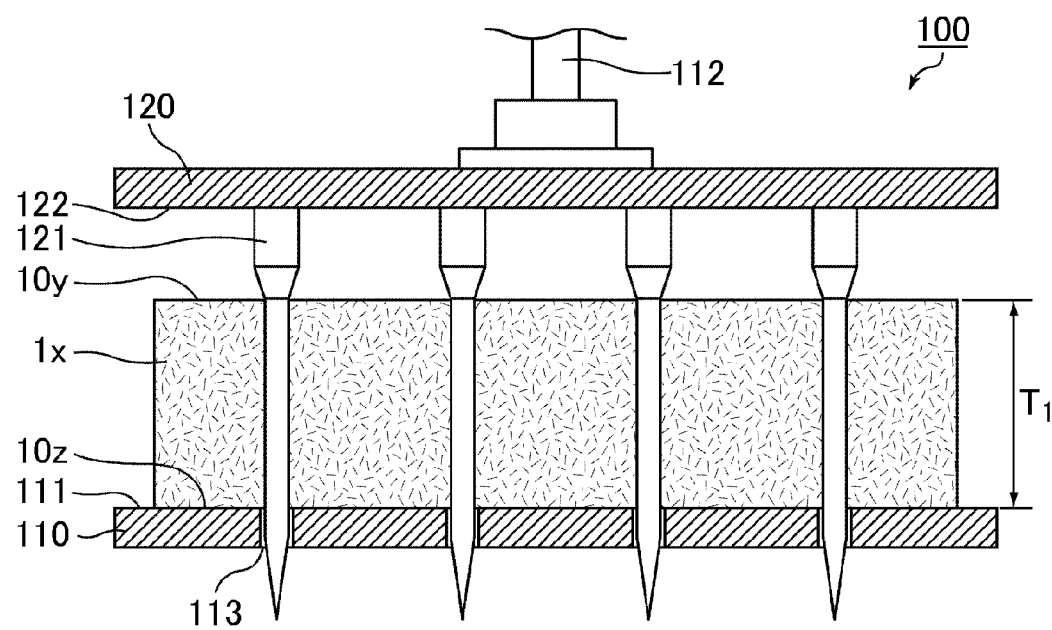
FIG. 2B is a cross-sectional view which schematically shows the barbless needling device and the sheet when the barbless needles according to the embodiment of the present invention penetrate the sheet.

FIG. 2A is a perspective view which schematically shows a barbless needling device and a sheet used in barbless needling according to the embodiment of the second aspect of the present invention, and FIG. 2B is a cross-sectional view which schematically shows the barbless needling device and the sheet when the barbless needles according to the embodiment of the second aspect of the present invention penetrate the sheet.

A barbless needling device 100 shown in FIG. 2A includes a supporting plate 110 having a mounting face 111 capable of supporting a sheet 1x, and a barbless needle plate 120 which is provided opposite to the mounting face 111 of the supporting plate 110 and attached to the end of a piston 112 movable up and down in a stinging direction (thickness direction of the sheet 1x shown by a double-headed arrow T1 in FIGS. 2A and 2B). The sheet 1x used herein is a sheet which is a flat plate shape with a predetermined thickness that is formed into a substantially rectangular shape in the plan view and includes entangled points formed by entangling inorganic fibers with one another (hereinafter, simply referred to as a sheet containing inorganic fibers).

A plurality of barbless needles 121 vertically arranged on a face 122 opposite to the supporting plate 110 are attached to the barbless needle plate 120 at a predetermined interval and the barbless needle plate 120 has a needle-point holder shape. The barbless needle 121 is a fine and sharp needle, on the surface of which a barb is not formed.

Through holes 113 are provided on the supporting plate 110 at portions corresponding to positions of the barbless needle plate 120 in which the barbless needles 121 are attached.

For this reason, when the barbless needle plate 120 is close to the supporting plate 110, the barbless needles 121 penetrate the through holes 113. Therefore, the barbless needle plate 120 can be moved close to the supporting plate 110 to such a degree that the mounting face 111 comes in contact with the opposite face 122.

In the case where the barbless needling device 100 is used to carry out barbless needling, the sheet 1x is placed on the mounting face 111 of the supporting plate 110, as shown in FIG. 2A.

The barbless needle plate 120 is then allowed to descend and ascend along the thickness direction of the sheet 1x.

Then, the barbless needles 121 penetrate the sheet 1x from a first principal face 10y to a second principal face 10z, as shown in FIG. 2B, and the penetrated barbless needles 121 are pulled out of the sheet 1x to complete barbless needling.

It is believed that since barbs are not formed on the barbless needles 121, inorganic fibers are hardly tangled with the barbless needles 121 and a large number of inorganic fibers at through portions of the barbless needles 121 fracture during penetration of the barbless needles 121 into the sheet 1x.

It is believed that when the barbless needles 121 are pulled out of the sheet 1x, inorganic fibers which are not entangled with one another by the repulsive force of the sheet 1x act to be returned so that the through portions are blocked, but all inorganic fibers cannot be completely returned.

Accordingly, it is estimated that inorganic fibers which are not entangled with one another and are arranged parallel to one another are present in a portion where the barbless needles 121 penetrate the sheet 1x (unentangled portion).

According to the findings of the inventors, a mat having the unentangled portions formed by barbless needling has higher air permeability than a mat not having the unentangled portions.

In a portion where the barbless needle 121 penetrates on the first principal face 10y, a first barbless needle through point is formed. Further, in a portion where the barbless needle 121 penetrates on the second principal face 10z, a second barbless needle through point corresponding to the first barbless needle through point on the first principal face 10y is formed.

The unentangled portion according to the embodiment of the second aspect of the present invention may be formed by allowing barbless needles to penetrate a sheet containing inorganic fibers. A specific shape thereof is not particularly limited; however, the specific shape is, for example, the same as the shape of the unentangled portion 12 formed in the mat 1 according to the embodiment of the first aspect of the present invention.

That is, the unentangled portion of the mat according to the embodiment of the second aspect of the present invention is provided on the mat from one of its principal faces to the other principal face, and may be formed of inorganic fibers arranged parallel to one another. In other words, the mat according to the embodiment of the second aspect of the present invention is a mat containing inorganic fibers, in which the unentangled portion is provided from one of its principal faces to the other principal face, wherein inorganic fibers that fracture and are not entangled with one another are present in the unentangled portion.

Since the detailed structures of the unentangled portion has already been described with reference to FIGS. 1A and 1B, the description thereof is omitted.

Since the mat according to the embodiment of the second aspect of the present invention has higher air permeability, in the case where the mat is impregnated with the organic binder solution to manufacture an impregnated mat, and the impregnated mat is dried with dry air, or the like, to manufacture a binder mat, the drying time tends to be greatly reduced. This makes it easier to increase the manufacturing efficiency of the binder mat and keep down the manufacturing cost. Therefore, in the case where a holding sealing material is manufactured by cutting the binder mat into a predetermined shape, or the like, the manufacturing cost tends to be kept down.

In the mats according to embodiments of the first and second aspects of the present invention (hereinafter, collectively referred to as a mat according to embodiments of the present invention), the formation density of the unentangled portion is preferably about 1 pcs/cm2 to about 20 pcs/cm2. In the present specification, the formation density of the unentangled portion refers to the number of the unentangled portion formed per square centimeter on a main cross-sectional face which is observed when the mat is cut into two substantially equal portions at the center of its thickness direction along a plain substantially parallel to the first and second principal faces, and the obtained main cross-sectional face is observed under a microscope or with the naked eye.

When the formation density of the unentangled portion is about 1 pcs/cm2 to about 20 pcs/cm2, since the number of the unentangled portion formed per unit area is sufficiently large, the air permeability of the mat tends to be increased. Therefore, when the mat is dried, the drying time tends to be further reduced. In addition, since the number of the unentangled portion formed per unit area is not too large, the repulsive force and strength of the mat tends to be kept to appropriate values.

In contrast, when the formation density of the unentangled portion is less than about 1 pcs/cm2, the number of the unentangled portion formed per unit area is too small. Therefore, when the mat is dried, the drying time is less likely to be reduced. In contrast, when the formation density of the unentangled portion is more than about 20 pcs/cm2, the number of the unentangled portion formed per unit area is too large, a portion where inorganic fibers are not entangled with one another is increased too much so that the repulsive force and strength of the mat tend to be reduced.

The mat according to the embodiment of the present invention further has an entangled portion provided from one of its principal faces to the other principal face, and it is preferable that inorganic fibers forming the entangled portion are closely entangled with one another as compared with inorganic fibers forming a portion other than the entangled portion.

In the entangled portion, inorganic fibers are closely entangled with one another as compared with a portion where the entangled portion and the unentangled portion are not formed, that is, entangled points (unformed region). Therefore, the bulkiness of the mat is moderately kept down around the entangled portion. For this reason, the bulkiness of the holding sealing material manufactured by cutting the manufactured mat into a predetermined shape, or the like, also tends to be moderately reduced.

Accordingly, in the case where the manufactured holding sealing material is used in manufacturing the apparatus for purifying exhaust gas, an exhaust gas treating body wrapped with the holding sealing material is more likely to be stuffed into the casing.

The mat according to the embodiment of the present invention preferably includes a first entangled portion which is formed of inorganic fibers closely entangled with one another while the entangled portions are oriented from one principal face side to the other principal face side, and a second entangled portion which is formed of inorganic fibers closely entangled with one another while the entangled portions are oriented from the other principal face side to one principal face side.

In the mat having structure of this kind, since a relation between the orientation direction of the inorganic fibers forming the first entangled portion and the orientation direction of the inorganic fibers forming the second entangled portion is opposite, the inorganic fibers are more complicatedly entangled, and the strength of the mat tends to be higher.

In the mat according to the embodiment of the present invention, the formation density of the entangled portion is preferably about 0.5 pcs/cm2 to about 30 pcs/cm2. In the present specification, the formation density of the entangled portion refers to the number of the entangled portion formed per square centimeter on a main cross-sectional face which is observed when the mat is cut into two substantially equal portions at the center of its thickness direction along a plain substantially parallel to the first and second principal faces, and the obtained main cross-sectional face is observed under a microscope or with the naked eye.

When the formation density of the entangled portion is about 0.5 pcs/cm2 to about 30 pcs/cm2, the bulkiness is moderately reduced and the strength of the mat tends to be further increased.

In contrast, when the formation density of the entangled portion is less than about 0.5 pcs/cm2, the number of the entangled portion formed per unit area is too small so that the bulkiness is less likely to be reduced. In contrast, when the formation density of the entangled portion is more than about 30 pcs/cm2, the bulkiness of the mat is reduced too much. Therefore, the repulsive force tends to be reduced and the holding force of the holding sealing material tends to be reduced. Moreover, since a large number of inorganic fibers shredded finely during the barb needling are contained, the strength of the mat tends to be reduced.

In the mat according to the embodiment of the present invention, it is preferable that the unentangled portions and the entangled portions are alternately formed at different positions at least partially.

In the case where portions where only the unentangled portions are unevenly formed are present, portions where inorganic fibers are not entangled with one another are present over a certain region, the strength of the mat around the portion tends to be reduced. In contrast, in the case where portions where only the entangled portions are unevenly formed are present, portion where inorganic fibers are closely entangled and the bulkiness is too low are present over a certain region, the thickness is less likely to be even over the whole mat. When the thickness of the whole mat is not even, an exhaust gas treating body is difficult to be held by the holding sealing material manufactured from the mat. In contrast, in the mat according to the embodiment of the present invention in which the unentangled portions and the entangled portions are alternately formed at different positions, the above-mentioned problems are less likely to occur. Since the unentangled portions are balanced, when the mat is dried, the drying time tends to be further reduced.

In the mat according to the embodiment of the present invention, the inorganic fibers are preferably at least one kind of inorganic fiber selected from the group including an alumina fiber, an alumina-silica fiber, a silica fiber, a soluble fiber, and a glass fiber.

Since these inorganic fibers tend to be superior in characteristics such as heat resistance, a mat formed of these inorganic fibers and a holding sealing material using the mat are superior in heat resistance, holding force, and the like.

In the case where soluble fibers are contained in the inorganic fibers forming a mat, the fibers are dissolved and eliminated from the body even if the soluble fibers are scattered and introduced into the body during handling the mat. Therefore, the soluble fiber tends to be superior in safety for the body.

It is preferable that the mat according to the embodiment of the present invention further contains an organic binder.

In the holding sealing material using the mat containing the organic binder, the organic binder is decomposed by high-temperature exhaust gases during use of the apparatus for purifying exhaust gas, and the adhesion of the inorganic fibers is removed to expand the holding sealing material, and therefore the holding sealing material tends to exert a high holding force.

It is preferable that the mat according to the embodiment of the present invention further contains an expansive agent.

In the holding sealing material using the mat containing the expansive agent, during use of the apparatus for purifying exhaust gas, the expansive agent is expanded by high-temperature exhaust gases, and therefore the holding sealing material tends to exert a high holding force.

The method for manufacturing a mat according to an embodiment of the present invention is a method for manufacturing a mat including entangled points formed by entangling inorganic fibers with one another, the method including allowing barbless needles to penetrate a sheet including the entangled points formed by entangling inorganic fibers with one another from at least one principal face side to the other principal face side.

According to the method for manufacturing a mat according to the embodiment of the present invention, the above-mentioned mat according to the embodiment of the present invention can be desirably manufactured.

Since the detailed barbless needling process has been already described in the explanation of the structure and effect of the mat according to the embodiment of the second aspect of the present invention, the description thereof is omitted.

The method for manufacturing a mat according to the embodiment of the present invention preferably further includes manufacturing a needling precursor sheet by allowing barb needles to penetrate a precursor sheet including entangled points formed by entangling an inorganic fiber precursors with one another from one side of its principal faces to the other principal face side; and firing the needling precursor sheet to manufacture the sheet.

The following description will describe the barb needling.

First, the following description will describe a barb needling device used in the barb needling.

The barb needling device has substantially the same structure as the barbless needling device shown in FIGS. 2A and 2B. However, the barb needling device differs in the use of a barb needle plate with barb needles instead of a barbless needle plate with barbless needles.

The barb needle is a fine and sharp needle, and a plurality of spine-shaped barbs that protrude toward the tip direction are formed on the surface of the barb needle.

In the case where the barb needling is carried out, a precursor sheet including entangled points formed by entangling inorganic fiber precursors with one another is placed on the mounting face of the supporting plate, and a barb needle plate descends and ascends along the thickness direction of the precursor sheet.

Then, the barb needles penetrate from the first principal face to the second principal face of the precursor sheet, and the penetrated barb needles are pulled out of the precursor sheet to complete barb needling.

In the barb needling, since the barb needles is allowed to proceed in the precursor sheet in a state where inorganic fiber precursors wrap around a barb, the inorganic fiber precursors wrapping around a barb is pulled into the inside of the precursor sheet.

Therefore, the inorganic fiber precursors placed at through portions of the barb needles are closely entangled with one another and oriented toward the direction in which the barb needles penetrate (that is, on the second principal face side).

When the barb needles are pulled out of the precursor sheet, since the inorganic fiber precursors are adversely less likely to be caught by the barbs, the orientation state and entangled state of most of the inorganic fiber precursors are maintained.

Accordingly, when the barb needles are completely pulled out of the precursor sheet, a needling precursor sheet, in which entangled portions are formed in the thickness direction from barb needle through points on the first principal face in which the barb needles penetrate to barb needle through points on the second principal face, can be manufactured.

The manufactured needling precursor sheet is fired to convert the inorganic fiber precursors into inorganic fibers, and provided to the barbless needling process as the sheet to manufacture a mat including entangled portions and unentangled portions.

In the method for manufacturing a mat according to the embodiment of the present invention, it is preferable that barb needling is carried out on both of the principal faces of the precursor sheet in the barb needling process.

In the case where the barb needling is carried out, a needling precursor sheet forming first and second entangled portions which are opposed to each other in the entangled direction of the inorganic fiber precursors can be manufactured.

Therefore, by carrying out firing and barbless needling processes on the needling precursor sheet, a mat forming the first and second entangled portions which are opposed to each other in the entangled direction of the inorganic fibers in addition to the unentangled portions can be manufactured.

The method for manufacturing a mat according to the embodiment of the present invention preferably further includes manufacturing a barbless needling sheet through the barbless needling process, and allowing barb needles to penetrate the barbless needling sheet from one of its principal faces to the other principal face.

As is the case of carrying out the above-mentioned barbless needling and barb needling processes, in the method for manufacturing a mat, a mat provided with the entangled portions in the thickness direction from the barb needle through points on the first principal face to the barb needle through points on the second principal face in addition to the unentangled portions can be desirably manufactured.

In the method for manufacturing a mat according to the embodiment of the present invention, it is preferable that barb needling is carried out on both of the principal faces of the barbless needling sheet in the barb needling process.

In the case where the barb needling process is carried out, a mat forming the first and second entangled portions which are opposed to each other in the entangled direction of the inorganic fibers can be manufactured in addition to the unentangled portions.

In the method for manufacturing a mat according to the embodiment of the present invention, it is preferable that a position where the barbless needle penetrates and a position where the barb needle penetrates are alternated and differ from each other at least partially.

In the method for manufacture a mat, a mat in which the unentangled portions and the entangled portions are alternately formed at different positions at least partially can be desirably manufactured.

It is preferable that the method for manufacturing a mat according to the embodiment of the present invention further includes impregnating a mat with an organic binder solution to manufacture an impregnated mat; and drying the impregnated mat.

In the method for manufacture a mat, a mat containing an organic binder can be desirably manufactured.

It is preferable that the method for manufacturing a mat according to the embodiment of the present invention further includes producing slurry containing inorganic fibers by a sheet-forming process to manufacture a formed sheet and the formed sheet is used as the sheet.

The apparatus for purifying exhaust gas according to an embodiment of the present invention includes an exhaust gas treating body, a casing housing the exhaust gas treating body, and a holding sealing material placed between the exhaust gas treating body and the casing, wherein the holding sealing material uses any of the mats according to the embodiment of the present invention.

The apparatus for purifying exhaust gas according to an embodiment of the present invention includes an exhaust gas treating body, a casing housing the exhaust gas treating body, and a holding sealing material which is placed between the exhaust gas treating body and the casing and holds the exhaust gas treating body, wherein the holding sealing material uses any of the mats manufactured in the method for manufacturing a mat according to the embodiment of the present invention.

(First Embodiment)

Referring to the drawings, the following description will describe the first embodiment as one embodiment of the mat, the method for manufacturing the mat, and the apparatus for purifying exhaust gas of the present invention.

Figure 3A:
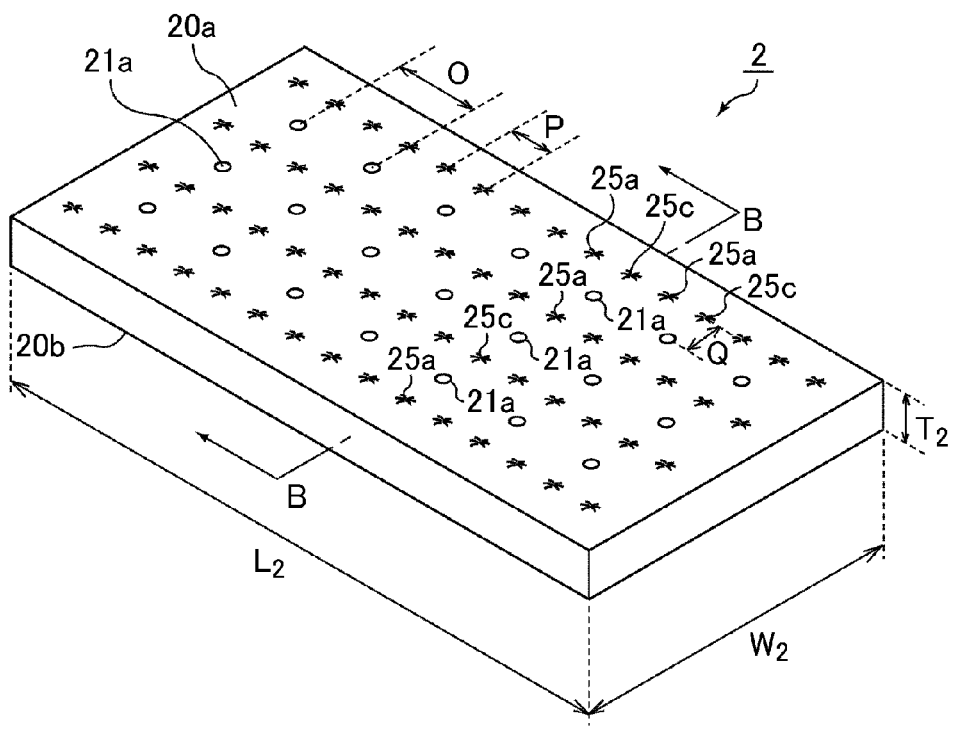
FIG. 3A is a perspective view which schematically shows a mat of a first embodiment of the present invention.
Figure 3B:
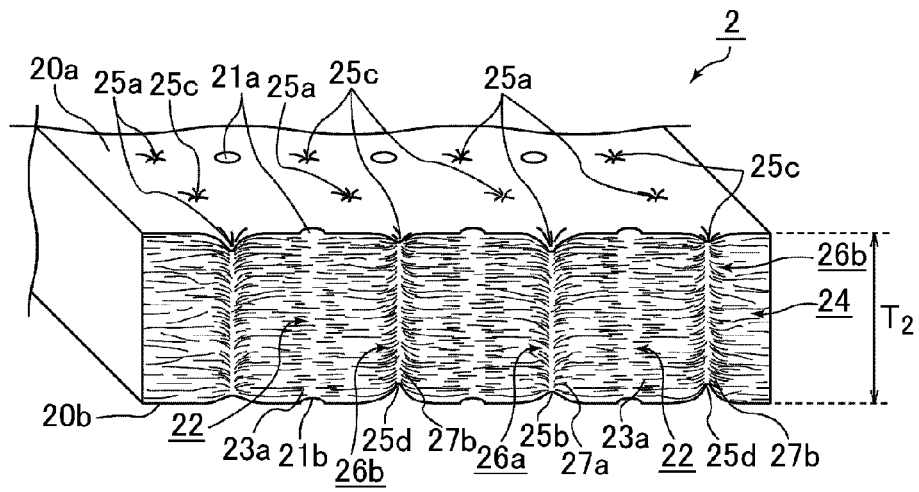
FIG. 3B is a B-B line cross-sectional view of the mat shown in FIG. 3A.

FIG. 3A is a perspective view which schematically shows the mat of the first embodiment of the present invention, and FIG. 3B is a B-B line cross-sectional view of the mat shown in FIG. 3A.

Figure 4:
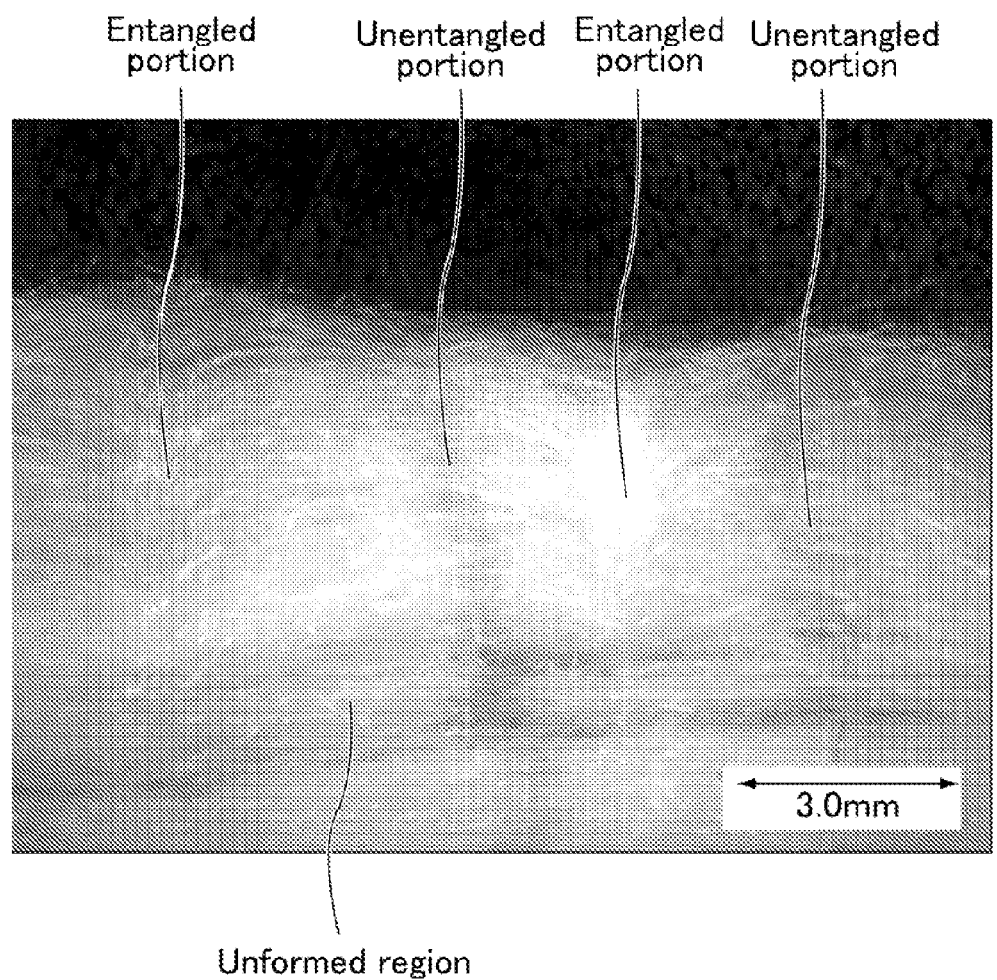
FIG. 4 is a microscope photograph in which a sample for observing a cross-sectional face manufactured as an example of the mat according to the first embodiment of the present invention has been cut substantially along the thickness direction and perpendicularly to the principal face so that the unentangled portions and the entangled portions can be seen on a cut face, and the cut face is magnified 25 times.

FIG. 4 is a microscope photograph in which a sample for observing a cross-sectional face manufactured as an example of the mat according to the first embodiment of the present invention has been cut substantially along the thickness direction and perpendicularly to the principal face so that the unentangled portions and the entangled portions can be seen on a cut face, and the cut face is magnified 25 times.

As shown in FIGS. 3A and 3B, a mat 2 of the present embodiment has a substantially rectangular shape in the plan view having predetermined length (indicated by a double-headed arrow $L_2$ in FIG. 3A), width (indicated by a double-headed arrow $W_2$ in FIG. 3A) and thickness (indicated by a double-headed arrow $T_2$ in FIG. 3A).

The mat 2 has a first principal face 20a, which has the largest area of principal faces of the mat 2 and a second principal face 20b opposite to the first principal face 20a.

Although not particularly limited, for example, the size of the mat 2 is preferably set to about 100 mm to about 10000 mm in length×about 100 mm to about 1500 mm in width× about 5 mm to about 30 mm in thickness.

Although not particularly limited, the weight per unit area of the mat 2 is preferably set to about 900 $g/m^2$ to about 3000 $g/m^2$. The weight per unit area of the mat 2 is more preferably set to about 1500 $g/m^2$ to about 2800 $g/m^2$.

The density of the mat 2 is preferably set to about 0.08 $g/m^2$ to about 0.20 $g/cm^3$. The density of the mat 2 is more preferably set to about 0.10 $g/m^2$ to about 0.15 $g/cm^3$.

The mat 2 is formed by entangling inorganic fibers with one another.

As shown in FIGS. 3B and 4, when observing a cross-sectional face which is formed by cutting the mat 2 substantially along the thickness direction and perpendicularly to the first and second principal face 20a and 20b, in entangled points (unformed region) 24 except for unentangled portions 22, first entangled portions 26a, and second entangled portions 26b described later, most of the inorganic fibers are oriented along the direction substantially parallel to the first principal face 20a and the second principal face 20b of the mat 2, and are loosely entangled with one another.

The inorganic fiber is at least one kind of inorganic fiber selected from the group including an alumina fiber, an alumina-silica fiber, a silica fiber, a soluble fiber, and a glass fiber.

The mat 2 is manufactured by following method. At first inorganic fiber precursors manufactured by a spinning method (blowing method) is laminated by a cross-layer method to manufacture a precursor sheet. Then the manufactured precursor sheet is fired. The mat 2 is manufactured through other several processes. The blowing method and cross-layer method will be explained later in explanation of the method for manufacturing the mat 2.

The alumina fibers may contain an additive such as CaO, MgO and $ZrO_2$, in addition to alumina.

The composition ratio of the alumina-silica fiber is preferably set to $Al_2O_3$:$SiO_2$ of (about 60:about 40) to (about 80:about 20) and more preferably set to $Al_2O_3$:$SiO_2$ of (about 70:about 30) to (about 74:about 26), in weight ratios.

The silica fibers may contain an additive such as CaO, MgO and $ZrO_2$, in addition to silica.

The soluble fiber is an inorganic fiber made of at least one kind of compound selected from the group including alkali metal compounds, alkaline-earth metal compounds, and boron compounds.

The soluble fibers made of these compounds are so-called bio-soluble inorganic fibers, and are more likely to be dissolved when introduced into the body. Therefore, a mat containing these inorganic fibers is superior in safety for the body. Examples of the alkali metal compound include, for example, oxides of Na and K, and the like, and examples of the alkaline-earth metal compound include oxides of Mg, Ca, and Ba, and the like. Examples of the boron compound include oxides of B, and the like.

As shown in FIGS. 3A, 3B, and 4, a plurality of first barbless needle through points 21a are formed on the substantially whole of the first principal face 20a at predetermined intervals, and a plurality of second barbless needle through points 21b are formed on the substantially whole of the second principal face 20b at predetermined intervals.

Unentangled portions 22 are provided from the first barbless needle through points 21a to the second barbless needle through points 21b. That is, the unentangled portions 22 are formed over the substantially whole of the mat 2 at predetermined intervals.

The unentangled portion 22 includes inorganic fibers 23a which are not entangled with one another and are arranged parallel to one another.

The formation density of the unentangled portions 22 is preferably about 0.5 pcs/$cm^2$ to about 25 pcs/$cm^2$, and more preferably about 1 pcs/$cm^2$ to about 20 pcs/$cm^2$.

The shortest distance between one first barbless needle through point 21a (one second barbless needle through point 21b) and the other first barbless needle through point 21a (the other second barbless needle through point 21b) most close to the one first barbless needle through point 21a (the one second barbless needle through point 21b) (distance shown by a double-headed arrow O in FIG. 3A) is about 1 mm to about 20 mm.

Thus, since the unentangled portions 22 containing inorganic fibers which are not entangled with one another are not assembled too tightly, the strength of the mat 2 tend to be sufficiently high. In the case where the distance between the barbless needle through points (unentangled portions) which functions as a venting hole is not too long and the mat 2 is impregnated, and then dried, the whole mat 2 including entangled points (unformed region) 24 tend to be dried evenly, and the drying time tend to be further reduced.

The diameters of the first barbless needle through points 21a and the second barbless needle through points 21b are about 0.1 mm to about 3 mm.

Therefore, since the diameters of the first barbless needle through points 21a and the second barbless needle through points 21b (diameters of the unentangled portions 22) are not too large, the strength of the mat 2 tend to be sufficiently high. Since the diameters of the first barbless needle through points 21a and the second barbless needle through points 21b (diameters of the unentangled portions 22) are not too small, the unentangled portions 22 tend to exert the function of a venting hole. Therefore when the mat 2 is impregnated and then dried, the whole mat 2 including entangled points (unformed region) 24 tend to be dried evenly, and the drying time tends to be further reduced.

A plurality of first barb needle through points 25a are formed on the substantially whole of the first principal face 20a at predetermined intervals, and a plurality of second barb needle through points 25b are formed on the substantially whole of the second principal face 20b at predetermined intervals. First entangled portions 26a are provided from the first barb needle through points 25a to the second barb needle through points 25b. That is, the first entangled portions 26a are formed over the substantially whole of the mat 2 at predetermined intervals.

Inorganic fibers 27a forming the first entangled portions 26a are oriented to the second principal face 20b side and are closely entangled with one another.

A plurality of third barb needle through points 25c are formed on the substantially whole of the first principal face 20a at predetermined intervals, and a plurality of fourth barb needle through points 25d are formed on the substantially whole of the second principal face 20b at predetermined intervals. Second entangled portions 26b are provided from the third barb needle through points 25c to the fourth barb needle through points 25d. That is, the second entangled portions 26b are formed over the substantially whole of the mat 2 at predetermined intervals.

Inorganic fibers 27b forming the second entangled portion 26b are oriented to the first principal face 20a side and are closely entangled with one another.

The total formation density of the first entangled portions 26a and the second entangled portions 26b (simply referred to as the formation density of the entangled portions in the following description) is about 0.5 pcs/$cm^2$ to about 30 pcs/$cm^2$.

The shortest distance between the first barb needle through points 25a (the second barb needle through points 25b) and the third barb needle through points 25c (the fourth barb needle through points 25d) most close to the first barb needle through points 25a (the second barb needle through points 25b) (distance shown by a double-headed arrow P in FIG. 3A) is about 1 mm to about 10 mm.

Thus, since the first entangled portions 26a and the second entangled portions 26b are apart from each other moderately, and are not assembled too tightly, the strength of the mat 2 tend to be sufficiently high.

The diameters of the first barb needle through points 25a, the second barb needle through points 25b, the third barb needle through points 25c, and the fourth barb needle through points 25d are about 0.1 mm to about 2 mm.

Therefore, the diameters of the first barb needle through points 25a, the second barb needle through points 25b, the third barb needle through points 25c, and the fourth barb needle through points 25d are not too large, and the strength of the mat 2 tend to be sufficiently secured.

The shortest distance between the first barbless needle through points 21a (the second barbless needle through points 21b) and the first barb needle through points 25a or the third barb needle through points 25c (the second barb needle through points 25b or the fourth barb needle through points 25d) most close to the first barbless needle through points 21a (the second barbless needle through points 21b) (distance shown by a double-headed arrow Q in FIG. 3A) is about 1 mm to about 10 mm.

Thus, since the unentangled portions 22, the first entangled portions 26a, and the second entangled portions 26b are apart from one another moderately, and are not assembled too tightly, the strength of the mat 2 tend to be sufficiently large.

As shown in FIGS. 3A and 3B, the unentangled portions 22, the first entangled portions 26a, and the second entangled portions 26b are alternately formed at different positions at substantially equal intervals in a portion where the unentangled portions 22 (first barbless needle through points 21a and the second barbless needle through points 21b), the first entangled portions 26a (the first barb needle through points 25a and the second barb needle through points 25b), and the second entangled portions 26b (the third barb needle through points 25c and the fourth barb needle through points 25d) are formed in a row along the width direction of the mat 2. The first entangled portions 26a and the second entangled portions 26b are alternately aligned at substantially equal intervals in a portion where the first entangled portions 26a and the second entangled portions 26b are formed in a row along the width direction of the mat 2.

The respective unentangled portions 22 are aligned at substantially equal intervals in a portion where only the unentangled portions 22 are formed in a row along the length direction of the mat 2.

The first entangled portions 26a and the second entangled portions 26b are alternately aligned at substantially equal intervals in a portion where the first entangled portions 26a and the second entangled portions 26b are formed in a row along the length direction of the mat 2.

As described herein, it is preferable that in at least one part of the mat 2, the unentangled portions 22, the first entangled portions 26a, and the second entangled portions 26b are alternately formed at different positions.

The unentangled portions, the first entangled portions, and the second entangled portions may be alternately formed at different positions in the whole mat based on the following arrangement. The arrangement is that the unentangled portions, the first entangled portions, and the second entangled portions are alternately aligned at substantially equal intervals and the unentangled portions, the first entangled portions, and the second entangled portions are alternately aligned at substantially equal intervals.

The total formation density of the unentangled portions 22, the first entangled portions 26a, and the second entangled portions 26b is preferably about 5 pcs/cm$^2$ to about 35 pcs/cm$^2$. This is because the drying time in the drying process is further reduced and the repulsive force of the mat 2 is not reduced too much.

Next, referring to the drawings, the following description will describe the structure of the holding sealing material and apparatus for purifying exhaust gas using the mat of the present embodiment.

Figure 5:
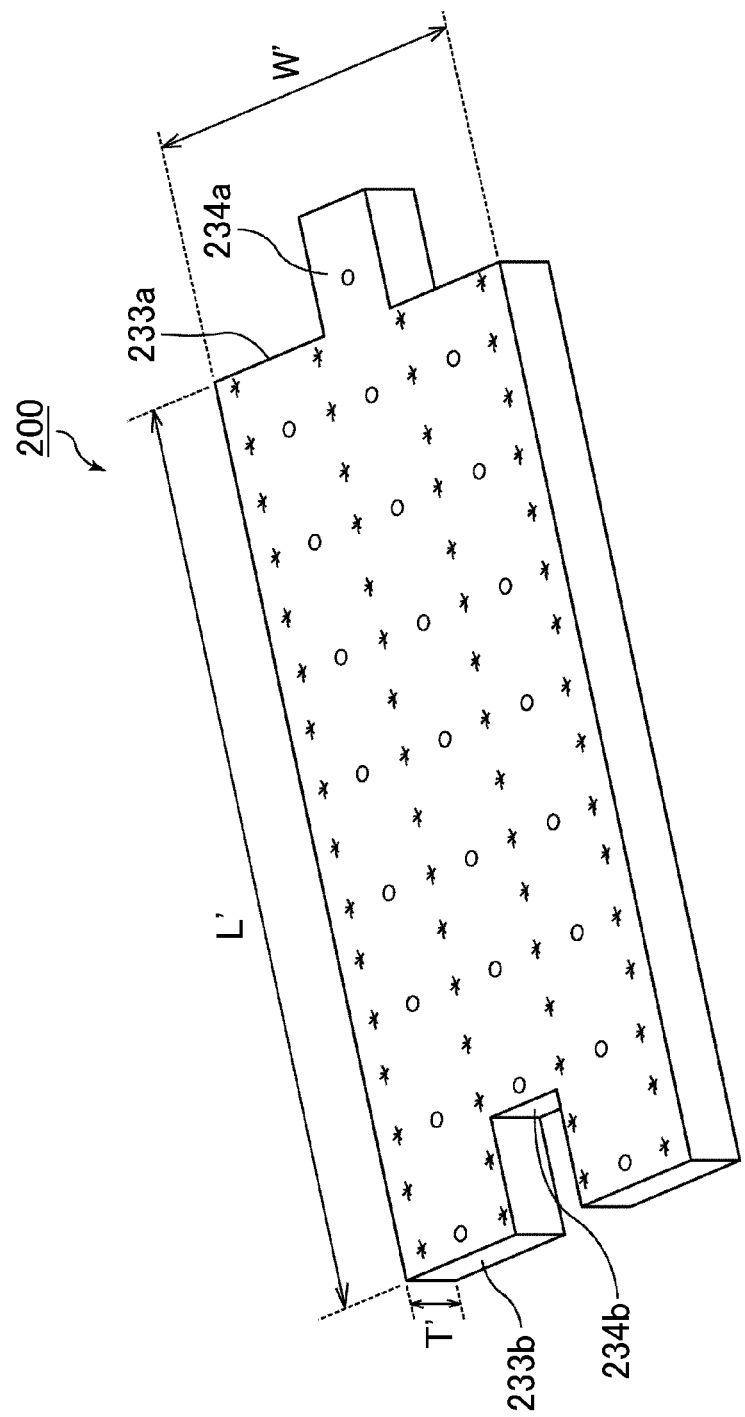
FIG. 5 is a perspective view which schematically shows one example of the holding sealing material using the mat of the first embodiment of the present invention.

FIG. 5 is a perspective view which schematically shows one example of the holding sealing material using the mat of the first embodiment of the present invention.

A holding sealing material 200 shown in FIG. 5 is manufactured by impregnating the above-mentioned mat 2 of the present embodiment with an organic binder solution to manufacture an impregnated mat, drying the impregnated mat with dry air to manufacture a binder mat, and cutting the manufactured binder mat into a predetermined shape.

The holding sealing material 200 shown in FIG. 5 has a substantially rectangular shape in the plan view having predetermined length (indicated by an arrow L' in FIG. 5), width (indicated by an arrow W' in FIG. 5), and thickness (indicated by an arrow T' in FIG. 5).

With respect to end faces 233a and 233b parallel to the width direction of the holding sealing material 200, a projected portion 234a is formed on one end face 233a, and a recessed portion 234b is formed on the other end face 233b, the recessed portion 234b having a shape to which the projected portion 234a is fitted when the holding sealing material 200 is rolled up so that the end face 233a and the end face 233b are made in contact with each other.

The total amount of the organic binder in the whole holding sealing material 200 manufactured is preferably about 0.5% by weight to about 20% by weight based on the amount of the whole holding sealing material 200.

Although not particularly limited, for example, the size of the holding sealing material 200 is set to about 200 mm to about 1000 mm in length, about 50 mm to about 500 mm in width, about 5 mm to about 30 mm in thickness.

For example, the holding sealing material 200 is suitably used for the apparatus for purifying exhaust gas.

Referring to the drawings, the following description will describe the structure of the apparatus for purifying exhaust gas using the holding sealing material 200.

Figure 6A:
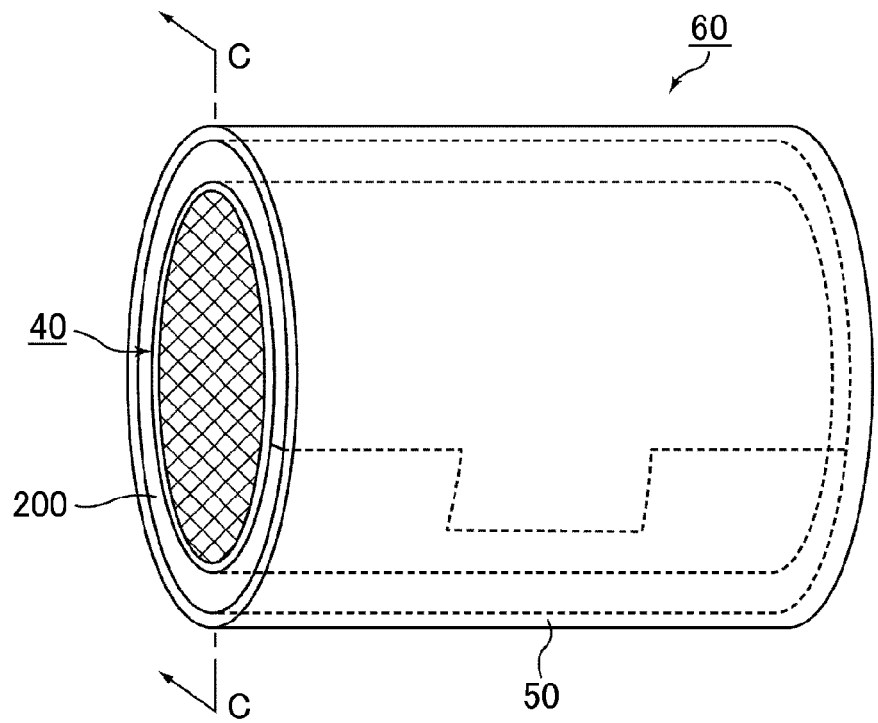
FIG. 6A is a perspective view which schematically shows an apparatus for purifying exhaust gas of the first embodiment of the present invention.
Figure 6B:
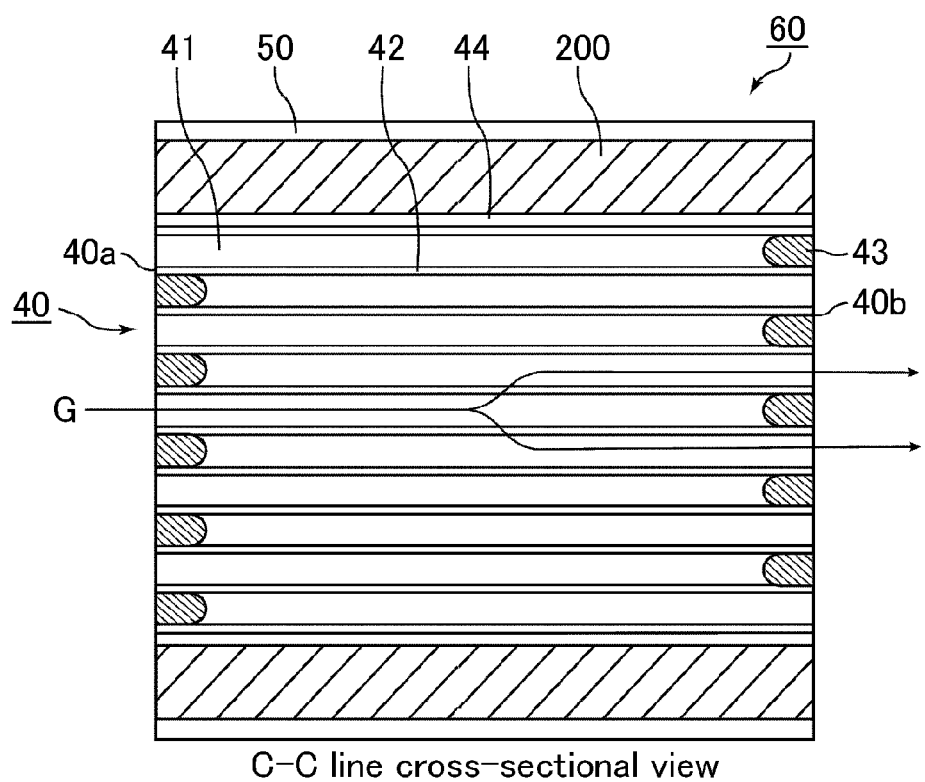
FIG. 6B is a C-C line cross-sectional view of the apparatus for purifying exhaust gas shown in FIG. 6A.

FIG. 6A is a perspective view which schematically shows an apparatus for purifying exhaust gas of the first embodiment of the present invention, and FIG. 6B is a C-C line cross-sectional view of the apparatus for purifying exhaust gas shown in FIG. 6A.

Figure 7A:
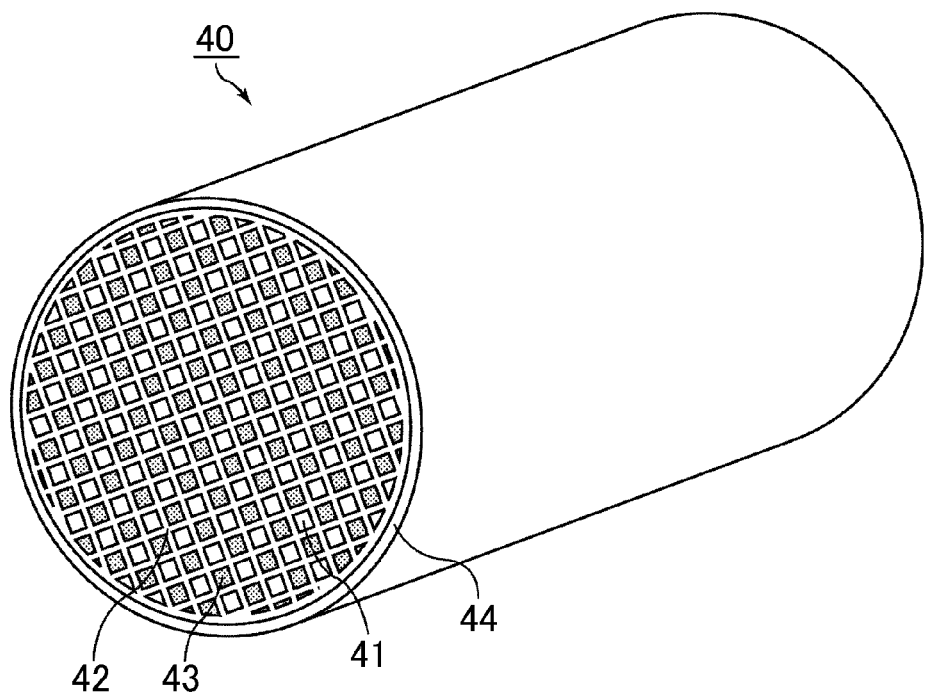
FIG. 7A is a perspective view which schematically shows an exhaust gas treating body forming the apparatus for purifying exhaust gas shown in FIG. 6A.
Figure 7B:
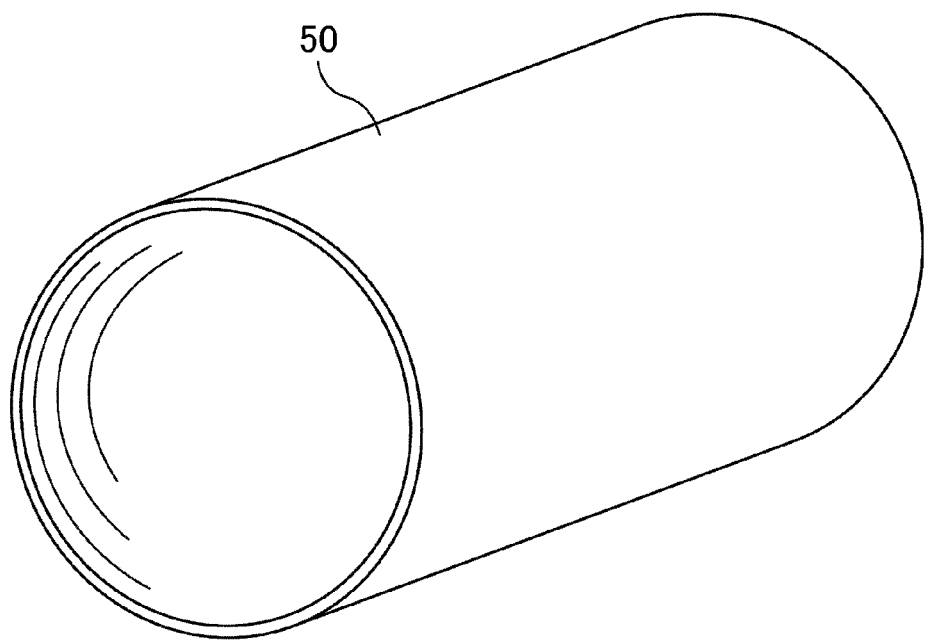
FIG. 7B is a perspective view which schematically shows the casing forming the apparatus for purifying exhaust gas shown in FIG. 6A.

FIG. 7A is a perspective view which schematically shows an exhaust gas treating body forming the apparatus for purifying exhaust gas shown in FIG. 6A, and FIG. 7B is a perspective view which schematically shows the casing forming the apparatus for purifying exhaust gas shown in FIG. 6A.

As shown in FIGS. 6A and 6B, an apparatus for purifying exhaust gas 60 includes a pillar shaped exhaust gas treating body 40, in which a large number of cells 41 longitudinally disposed in parallel with each other with a cell wall interposed therebetween, a casing 50 housing the exhaust gas treating body 40, and the holding sealing material 200 which is placed between the exhaust gas treating body 40 and the casing 50 and holds the exhaust gas treating body 40.

Since the structure of the holding sealing material 200 has been already described, the explanation thereof will be omitted.

In the end of the casing 50, an introduction pipe for introducing exhaust gases discharged from an internal combustion engine and a discharge pipe for discharging exhaust gases passing through the apparatus for purifying exhaust gas to the outside may be connected with each other.

As shown in FIG. 7A, the exhaust gas treating body 40 is mainly made of a porous ceramic and is round pillar-shape. A sealing material layer 44 is provided in the outer circumference of the exhaust gas treating body 40 in order to reinforce the outer circumference of the exhaust gas treating body 40, arrange the shape, or improve the heat-insulating property of the exhaust gas treating body 40.

Either of the ends of each cell of the exhaust gas treating body 40 is sealed with a sealant 43.

The exhaust gas treating body 40 is made of cordierite, aluminium titanate, or the like, and may be integrally formed as shown in FIG. 7A. Further, a plurality of pillar honeycomb fired bodies, which are made of silicon carbide or silicon carbide containing silicon, and in which a large number of cells longitudinally disposed in parallel with each other with a cell wall interposed therebetween, may be attached by interposing an adhesive layer mainly containing ceramic.

The following description will describe the casing 50. The casing 50 shown in FIG. 7B is mainly made of metal such as stainless steel, and is a cylindrical. The inner diameter of the casing is slightly smaller than the diameter of the exhaust gas treating body 40 in a state of being wrapped with the holding sealing material 200, and the length is substantially the same as in the longitudinal direction of the exhaust gas treating body 40.

The material of the casing is not limited to the above-mentioned stainless steel as long as it is metal with heat resistance, and may be metal such as aluminium and iron.

The casing may be a casing in which a cylindrical casing is divided along the longitudinal direction into a plurality of casing pieces (that is, clamshell), a cylindrical casing having a slit at only one portion and a C-shaped or U-shaped cross-sectional face, or a metal plate and the like, for forming a cylindrical casing wrapped around the outer circumference of the holding sealing material which is also wrapped around the exhaust gas treating body.

Referring to FIG. 6B, the following description will describe the reason why exhaust gases are purified by the apparatus for purifying exhaust gas 60 having the above-mentioned structure.

As shown in FIG. 6B, exhaust gases which are discharged from an internal combustion engine and are allowed to flow into the apparatus for purifying exhaust gas 60 (in FIG. 6B, the exhaust gases are shown by G, and the flow direction of the exhaust gases is shown by an arrow). Then the exhaust gases are allowed to flow into one cell 41 having an opening at an end face 40a on an exhaust gas flow-in side of the exhaust gas treating body 40, and pass through cell walls 42 separating the cell 41 from an adjacent cell. In this case, particulate matter in exhaust gases (hereinafter, simply referred to as PM) is caught in the cell walls 42, and the exhaust gases are purified. The purified exhaust gases are allowed to flow out from the other cell 41 having an opening at an end face 40b on an exhaust gas discharge side, and discharged outside.

Next, the following description will describe a method for manufacturing the mat of the present embodiment, a method for manufacturing a binder mat using the manufactured mat, a method for manufacturing a holding sealing material using the binder mat, and a method for manufacturing an apparatus for purifying exhaust gas using the manufactured holding sealing material.

The mat of the present embodiment is manufactured through the following processes (1) to (5).

Here, the description will describe a method for manufacturing a mat containing alumina-silica fibers. However, inorganic fibers forming the mat of the present embodiment is not limited to the alumina-silica fiber, and inorganic fibers having various compositions such as the above-mentioned alumina fibers may be used.

(1) Spinning

Silica sol is added to a basic aluminum chloride aqueous solution adjusted to have predetermined values of an Al content and a molecular ratio of Al and Cl so that a composition ratio of $Al_2O_3:SiO_2$ in inorganic fibers after firing falls in the range of (about 60:about 40) to (about 80:about 20) (weight ratio). Moreover, a proper amount of an organic polymer is further added to improve the moldability.

The resulting mixed solution is condensed to form a spinning mixture, and this spinning mixture is spun by a blowing method so that inorganic fiber precursors having a predetermined average fiber diameter is manufactured.

The blowing method refers to a method in which the inorganic fiber precursors are spun by supplying the spinning mixture, extruded from a spinning mixture supplying nozzle, into a high-speed gas flow (air flow) blown through an air nozzle.

(2) Compression

Next, the precursor sheet having a predetermined size is manufactured by laminating the inorganic fiber precursors by the cross-layer method.

In the cross-layer method, a laminator including a belt conveyor for conveying in a certain direction, and an arm which is movable back and forth on the belt conveyor in a direction perpendicular to the conveying direction of the belt conveyor, and supplies inorganic fiber precursors (precursor web) compressed into a thin-layer sheet is used.

In the case where a precursor sheet is manufactured by the cross-layer method with this laminator, the belt conveyor is first driven for conveyance. In this state, the precursor web is continuously supplied from the arm to the belt conveyor, while the arm moves back and forth in the direction perpendicular to the conveying direction of the belt conveyor. Thus, while the precursor web is folded a plurality of times on the belt conveyor and laminated, the precursor web is continuously conveyed in the certain direction by the belt conveyor. The laminated precursor web is cut into a proper length so that the length of the precursor web is suitable for handling, to manufacture a precursor sheet having a predetermined size.

In the precursor sheet manufactured by the cross-layer method, most inorganic fiber precursors are oriented along a direction substantially parallel to the first and second principal faces, and loosely entangled with one another.

(3) Barb Needling

In a barb needling process, barb needling is carried out by using a barb needling device.

The barb needling device has substantially the same structure as the barbless needling device shown in FIG. 2A, and has a barb needling device provided with a barb needle plate instead of a barbless needle plate may be used.

In this case, there is used a needle plate to which at predetermined intervals, the predetermined number of barb needles (barb needle having a predetermined diameter) per unit area of a face opposite to the barb needle plate are attached so that the formation density of the entangled portions formed on the mat manufactured through the following processes is about 0.5 pcs/cm$^2$ to about 30 pcs/cm$^2$, the shortest distance between one first barb needle through point (one second barb needle through point) and the other first barb needle through point (the other second barb needle through point) most close to the one first barb needle through point (the one second barb needle through point) is about 1 mm to about 10 mm, and the diameter of the first and second barb needle through points is about 0.1 mm to about 2 mm. To change the formation density of the entangled portion, the number of barb needling may be properly changed.

In the case where barb needling is carried out, the precursor sheet manufactured in the process (2) is placed on a mounting face so that the mounting face of a supporting plate comes into contact with the second principal face (lower principal face), then a barb needle plate positioned above the supporting plate and the precursor sheet is descended along the thickness direction of the precursor sheet, and thus a plurality of barb needles are allowed to penetrate from the first principal face (upper principal face) side to the second principal face side. Then, by pulling the barb needles out of the precursor sheet, barb needling of the first time is carried out.

After the barb needling, the first principal face and the second principal face of the precursor sheet are reversed.

That is, the precursor sheet on which the barb needling of the first time is carried out is placed on the mounting face so that the mounting face of the supporting plate comes in contact with the first principal face of the precursor sheet.

The barb needle plate positioned above the supporting plate and the precursor sheet is descended along the thickness direction of the precursor sheet, and thus a plurality of barb needles are allowed to penetrate from the second principal face side to the first principal face side. Thus, the barb needling of the second time is carried out. At this time, the barb needle is allowed to penetrate the precursor sheet so that portions where the barb needle of the first time penetrates and positions where the barb needle of the second time penetrates are alternated and differ from each other.

Then, by pulling the barb needles out of the precursor sheet, a needling precursor sheet containing unfired inorganic fiber precursors are manufactured.

Here, a barb needling device provided with two barb needle plates which are opposed to each other by interposing the supporting plate and the precursor sheet is used, the barb needles are allowed to penetrate from both of the principal faces of the precursor sheet substantially at the same time, and therefore barb needling may be carried out on both of the principal faces of the precursor sheet.

(4) Firing

Successively, the needling precursor sheet is fired at a maximum temperature of about 1000° C. to about 1600° C. to convert an inorganic fiber precursor into inorganic fibers so that a sheet (needling sheet) is manufactured.

(5) Barbless Needling

Next, the sheet manufactured in the process (4) is provided to barbless needling process.

In the barbless needling process, for example, the barbless needling device shown in FIG. 2A is used to carry out barbless needling.

In this case, a barbless needle plate to which at predetermined intervals, the predetermined number of barbless needles (barbless needle having a predetermined diameter) per unit area of a face opposite to the barbless needle plate are attached is used to satisfy following conditions on the mat. These are that the formation density of the unentangled portions formed on the mat manufactured through the following processes is about 0.5 pcs/cm$^2$ to about 25 pcs/cm$^2$, the shortest distance between one first barbless needle through point (one second barbless needle through point) and the other first barbless needle through point (the other second barbless needle through point) most close to the one first barbless needle through point (the one second barbless needle through point) is about 1 mm to about 20 mm, the diameter of the first and second barbless needle through points is about 0.1 mm to about 3 mm, the shortest distance between one first barbless needle through point (one second barbless needle through point) and one first barb needle through point (the other second barb needle through point) most close to the one first barbless needle through point (the one second barbless needle through point) is about 1 mm to about 10 mm, and the unentangled portions and the entangled portions are alternately formed at different positions at least one part of the mat is used.

The sheet is placed on a mounting face of a supporting plate so that the mounting face of the supporting plate comes into contact with the second principal face (lower principal face) of the sheet, a barbless needle plate positioned above the supporting plate and the sheet is allowed to descend along the thickness direction of the sheet, and thus a plurality of barbless needles are allowed to penetrate from the first principal face (upper principal face) side to the second principal face side. At this time, the barbless needle is allowed to penetrate the sheet so that portions where the barb needle of the first time penetrates, portions where the barb needle of the second time penetrates and positions where the barbless needle penetrates are alternated and differ from each other at least partially.

Then the barbless needle is pulled out from the sheet.

The mat of the present embodiment is manufactured through the barbless needling.

The barbless needles may be allowed to penetrate from the second principal face to the first principal face using the barbless needling device provided with the barbless needle plate below the supporting plates. The barbless needles are allowed to penetrate from both of the principal faces using the barbless needling device provided with two barbless needle plates which are opposed to each other by interposing the supporting plate and the precursor sheet, and therefore barbless needling is carried out on both of the principal faces of the sheet.

After the barbless needling, the mat may be cut into a predetermined shape to improve handling property in the impregnating process described later.

In the case where the binder mat is manufactured using the mat of the present embodiment manufactured through the processes (1) to (5), the manufactured mat may be provided to the following process (6).

(6) Binder Imparting

By imparting the organic binder to the manufactured mat, the binder mat is manufactured.

Specifically, the binder imparting (6) includes impregnation (6-1), suction (6-2), and drying (6-3).

(6-1) Impregnation

The whole mat is impregnated evenly with the organic binder solution containing an organic binder by flow-coating, or the like.

Thus, the impregnated mat is manufactured.

Although not particularly limited, examples of the organic binder may include acrylic resin, rubber such as acrylic rubber, acrylonitrile-butadiene rubber, or styrene-butadiene rubber, a water-soluble organic polymer such as carboxymethyl cellulose or polyvinyl alcohol, a thermoplastic resin such as styrene resin, a thermosetting resin such as epoxy resin, and the like. Out of those examples, acrylic rubber, acrylonitrile-butadiene rubber, or styrene-butadiene rubber are particularly preferable.

Moreover, the organic binder solution can be prepared by dissolving the organic binder in solvent such as water or an organic solvent, or by dispersing the organic binder in a dispersion medium such as water.

Although not particularly limited, the concentration of the organic binder solution is properly adjusted so that the total amount of the organic binder contained in the whole binder mat manufactured through the following processes is about 0.5% by weight to about 20% by weight based on the amount of the whole binder mat.

(6-2) Suction

Then, an excessive organic binder solution is removed by suction from the impregnated mat using a suction device, or the like.

As the suction device, for example, a suction device including a suction table having a porous member capable of placing an impregnated mat, a suction cylinder part, and a suction pump, and having such a structure that one end of the suction cylinder part is connected to the suction table, and the other end of the suction cylinder part is connected to the suction pump can be suitably used.

In the case where the suction device having such a structure is used to carry out the suction, the impregnated mat is placed on the porous member of the suction table and the suction pump is operated. By operating the suction pump, air in the suction table is suctioned, the organic binder solution contained in the impregnated mat passes through the porous member and is discharged outside through the suction cylinder part.

As a result, an excessive organic binder solution is removed by suction from the impregnated mat.

The suction do not necessarily have to be carried out, if the amount of the organic binder solution contained in the impregnated mat is small, the obtained impregnated mat is dried directly after the impregnation.

(6-3) Drying

A binder mat is manufactured as a mat containing an organic binder by volatilizing the solvent and the like, contained in the organic binder solution remained in the impregnated mat.

In the case of drying the impregnated mat, drying is preferably carried out using a hot-air drying apparatus provided with two press plates made of metal or the like, while the impregnated mat is compressed.

In the case of using an air hot drying apparatus, drying may be carried out as follows.

Figure 8:
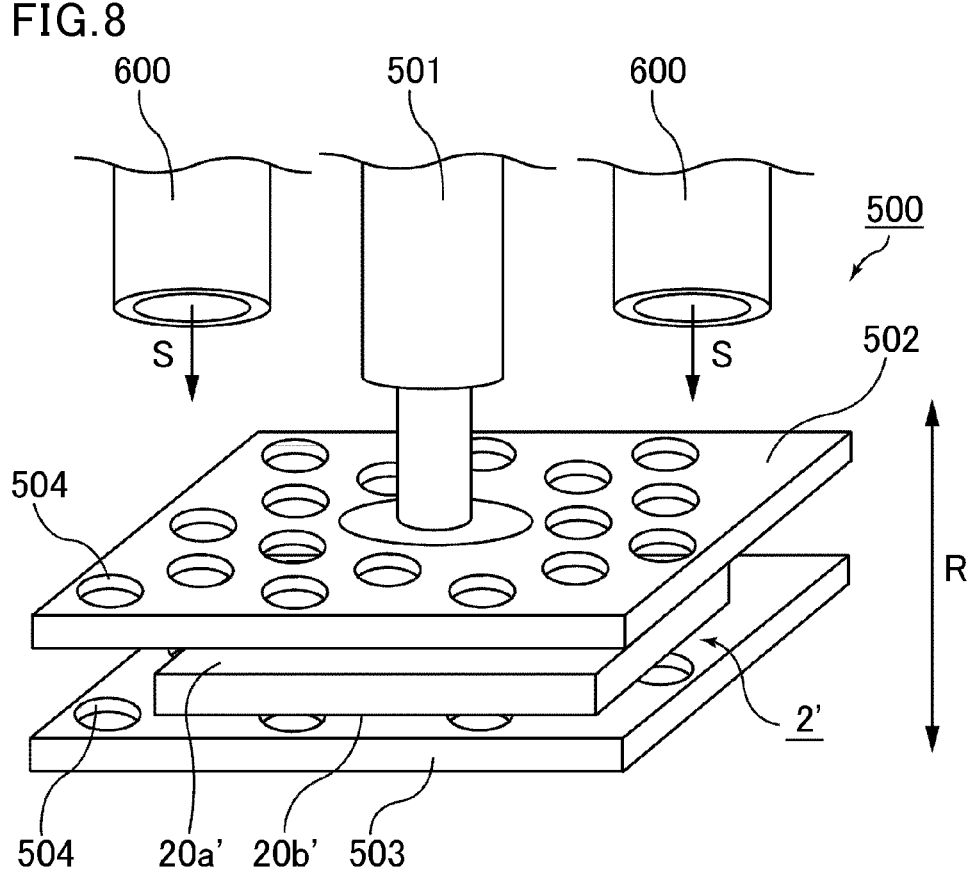
FIG. 8 is a perspective view which schematically shows a hot-air drying apparatus and an impregnated mat used in a drying process according to the embodiment of the present invention.

FIG. 8 is a perspective view which schematically shows a hot-air drying apparatus and an impregnated mat used in the drying process according to the embodiment of the present invention.

A hot-air drying apparatus 500 shown in FIG. 8 is attached to the end of a piston 501, and is provided with an upper press plate 502 movable up and down in a R direction shown in FIG. 8, a lower press plate 503 which is opposite to the upper press plate 502 and capable of placing an impregnated mat 2', and a hot-air outlet 600.

The upper press plate 502 and the lower press 503 are made of punching metal and the like, and includes a plurality of through holes 504 having such a predetermined size that hot air can pass therethrough.

In the case where the impregnated mat 2' is dried under compression using the hot-air drying apparatus 500, drying is carried out as follows.

The impregnated mat 2' is sandwiched between the upper press plate 502 and the lower press plate 503 from the side of a first principal face 20a' and the side of a second principal face 20b', and compressed to a predetermined thickness.

As shown in FIG. 8, hot air from the air outlet 600 connected to a hot-air generator (not shown) is sprayed on the impregnated mat 2', and the impregnated mat 2' is dried (in FIG. 8, a direction of spraying hot air is shown by an arrow S).

After drying for a predetermined time, the dried impregnated mat 2' is taken out from the hot-air drying apparatus, and the manufacture of a binder mat is completed.

In the case of drying the impregnated mat 2', the impregnated mat 2' is preferably dried by spraying hot air at about 100° C. to about 220° C. for about 1 minute to about 20 minutes.

When the temperature of the hot air is about 100° C. to about 220° C. and the hot air spraying time is about 1 minute to about 20 minutes, the organic binder cannot be decomposed, and further the impregnated mat 2' tends to be dried rapidly.

On the other hand, when the temperature of the hot air is lower than about 100° C., the drying time is more likely to be lengthened, and the manufacturing efficiency is more likely to be reduced. In contrast, when the temperature is more than about 220° C., the organic binder is more likely to be decomposed, and the inorganic fibers forming a binder mat is hardly bond to one another.

When the hot-air spraying time is less than about one minute, the impregnated mat 2' is hardly dried sufficiently. When the hot-air spraying time is more than about 20 minutes, the drying time tends to be lengthened, and the manufacturing efficiency tends to be reduced.

Apparatuses used in the drying process is not limited to the hot-air drying apparatus mentioned above, and a microwave drying apparatus, a heater having a heating element such as an electrically-heated wire heater and a ceramic heater, and the like, may be used. In the case of using the heating element, the heating element may be placed in a predetermined distance from the impregnated mat. Thus, air hot by the heating element is convected, and the same drying effect as is the case of using the hot-air drying apparatus can be obtained.

In the case where the impregnated mat is dried under compression, inorganic fibers are bond to one another by an organic binder in a state where the impregnated mat is compressed. Therefore, the thickness of the manufactured binder mat is thinner than that of a binder mat manufactured without compression.

In the case of compressing the impregnated mat, the impregnated mat is preferably compressed so as to have a thickness corresponding to about 50% to about 80% of that of the uncompressed impregnated mat.

When the impregnated mat is dried under compression so as to have a thickness corresponding to about 50% to about 80% of that of the uncompressed impregnated mat, inorganic fibers are not bond too tightly to one another by an organic binder, and the impregnated mat is less likely to be inferior in handling ability in the case of using it in the manufacture of the apparatus for purifying exhaust gas. Since the bulkiness of the impregnated mat can be reduced, when the apparatus for purifying exhaust gas is manufactured, an exhaust gas treating body wrapped with the holding sealing material made of a binder mat tends to be stuffed into a casing.

In contrast, when the thickness of the impregnated mat is dried under compression so as to have a thickness less than about 50% of the uncompressed impregnated mat, the thickness of the manufactured binder mat is too thin, and the exhaust gas treating body is difficult to be held by the holding sealing material When the thickness of the impregnated mat is dried under compression so as to have a thickness more than about 80% of the uncompressed impregnated mat, the bulkiness of the manufactured binder mat is not reduced. Therefore, in the case of manufacturing the apparatus for purifying exhaust gas, the exhaust gas treating body wrapped with the holding sealing material is difficult to be stuffed into a casing.

The total amount of the organic binder in the whole binder mat is preferably about 0.5% to about 20% by weight or less based on the amount of the whole binder mat.

In the case where the holding sealing material is manufactured using the binder mat manufactured through the process (6), the following process (7) is carried out by using the manufactured mat.

(7) Binder Mat Cutting

The binder mat is cut to manufacture a holding sealing material having a predetermined size. The holding sealing material is cut so that, of end faces of the holding sealing material, a projected portion is formed on a part of one end face, a recessed portion having a shape to which the projected portion is fitted is formed on a part of the other end face.

Specifically, by using a punching device provided with a punching plate which is attached to the end of a piston and is reciprocally movable in a vertical direction, and a mounting plate which is opposite to the punching plate and is capable of placing the binder mat, the holding sealing material may be manufactured.

A punching blade having a shape corresponding to the outer shape of the holding sealing material to be manufactured, and an elastic member made of elastic rubber and the like, are fixed onto the punching plate. A through hole is provided on the mounting plate at a position corresponding to the punching blade so that the punching blade does not come in contact with the mounting plate when the punching plate is close to the mounting plate.

When the binder mat is punched using the punching device, the binder mat is mounted on the mounting plate so that the first principal faces of the binder mat is located on the side of the punching plate and second principal faces of the binder mat are located on the side of the mounting plate, respectively. Then, the punching plate is moved in the vertical direction The elastic member is then pressed on the binder mat to constrict in the thickness of the binder mat, and at the same time, the punching blade enters the inside of the binder mat from the first principal face side, the punching blade penetrates the binder mat, and thus the binder mat is punched into a predetermined shape shown in FIG. 5 to manufacture the holding sealing material.

In the case where the apparatus for purifying exhaust gas is manufactured using the holding sealing material manufactured through the process (7), the following process (8) may be carried out.

Hereinafter, referring to the drawings, the following description will describe the process (8) of manufacturing the apparatus for purifying exhaust gas.

Figure 9:
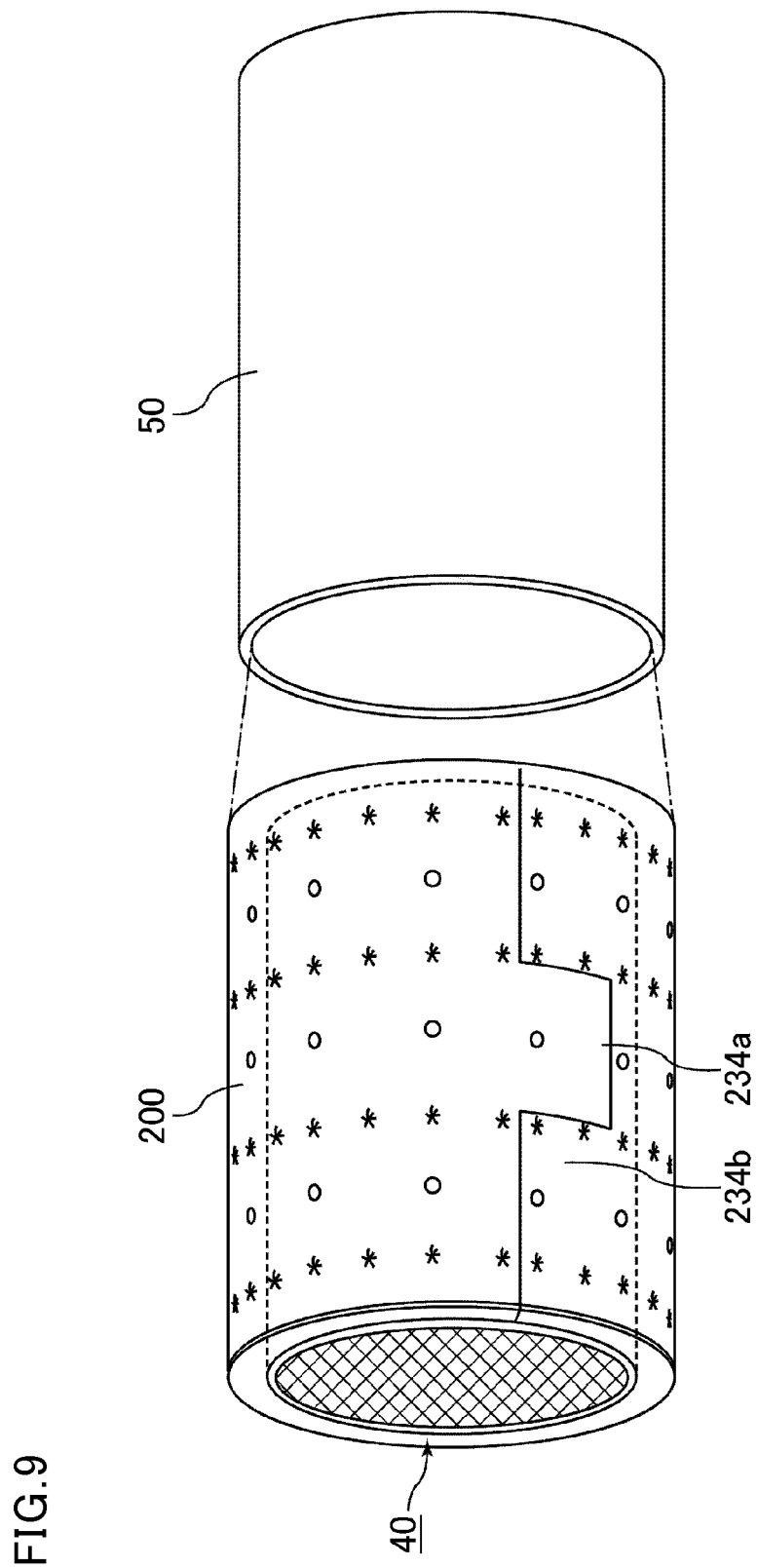
FIG. 9 is a perspective view which schematically shows a process of manufacturing the apparatus for purifying exhaust gas using the holding sealing material, the exhaust gas treating body, and the casing which form the apparatus for purifying exhaust gas of the first embodiment of the present invention.

FIG. 9 is a perspective view which schematically shows a process of manufacturing the apparatus for purifying exhaust gas using the holding sealing material, the exhaust gas treating body, and the casing which form the apparatus for purifying exhaust gas of the first embodiment of the present invention.

(8) Stuffing

The outer circumference of a round pillar-shaped exhaust gas treating body (honeycomb filter) 40 is wrapped with the holding sealing material 200 manufactured in the process (7) so that the projected portion 234*a* and the recessed portion 234*b* are fitted. As shown in FIG. 9, the holding sealing material 40 wrapped with the holding sealing material 200 is stuffed into the casing 50. The casing 50 has a predetermined size, is a cylindrical, and is mainly made of metal and the like.

In stuffing, there may be used a stuffing jig including a tapered cylindrical body which has one end having an inner diameter slightly smaller than the inner diameter of end of the casing and the other end having an inner diameter sufficiently larger than the other diameter of the exhaust gas treating body wrapped with the holding sealing material.

Through the above processes, the apparatus for purifying exhaust gas 60 of the present embodiment is manufactured.

The following description will describe the effect of the mat, the method for manufacturing the mat, and the apparatus for purifying exhaust gas accordance to the first embodiment of the present invention.

(1) The mat of the first embodiment of the present invention has unentangled portions provided from the first barbless needle through points to the second barbless needle through points. Since the unentangled portion includes inorganic fibers which are not entangled with one another and are arranged parallel to one another, the unentangled portion functions like a venting hole. For this reason, the mat tends to have high air permeability.

Accordingly, in the case where the impregnated mat is dried with dry air, or the like, to manufacture a binder mat, the drying time tends to be greatly reduced, and the manufacturing cost of the binder mat tends to be kept down.

Since the inorganic fibers which are not entangled with one another in the unentangled portion are present, although a plurality of unentangled portions are provided, the repulsive force of the mat (holding force of the holding sealing material) tends to be large.

(2) In the mat of the first embodiment of the present invention, since the formation density of the unentangled portion is about 0.5 pcs/cm$^2$ to about 25 pcs/cm$^2$, the number of the unentangled portion formed per unit area is large, and the mat tend to have high air permeability.

In addition, since the number of the unentangled portion formed per unit area is not too large, the repulsive force and strength of the mat can be kept to appropriate values. In the case where the density of the unentangled portion is about 1 pcs/cm$^2$ to about 20 pcs/cm$^2$, the mat tends to suitably exert the effect.

(3) In the entangled portion formed on the mat of the first embodiment of the present invention, inorganic fibers are closely entangled with one another as compared with entangled points (unformed region) where the entangled portion and the unentangled portion are not formed, and the bulkiness of the mat tends to be moderately kept down around the entangled portion.

(4) In the mat of the first embodiment of the present invention, the entangled portion is formed of the first and second entangled portions. Since relation between the orientation direction of the inorganic fibers forming the first entangled portion and the orientation direction of the inorganic fibers forming the second entangled portion is opposite, the inorganic fibers are more complicatedly entangled, and the strength of the mat tends to be larger.

(5) In the mat of the first embodiment of the present invention, since the formation density of the entangled portion (the total formation density of the first and second entangled portions) is about 0.5 pcs/cm$^2$ to about 30 pcs/cm$^2$, the bulkiness is moderately reduced and the strength of the mat tends to be further increased.

(6) In at least one part of the mat of the first embodiment of the present invention, the unentangled portions and the entangled portions are alternately formed at different positions.

In the case where portions where only the unentangled portions are unevenly formed are present, portions where inorganic fibers are not entangled with one another are present over a certain region, and therefore the strength of the mat around the portion tends to be reduced. In contrast, in the case where a portion where only the entangled portions are unevenly formed, since a portion where inorganic fibers are closely entangled and the bulkiness is too low are present over a certain region, the thickness is difficult to be even over the whole mat.

In contrast, in the mat of the present embodiment in which the unentangled portions and the entangled portions are alternately formed at different positions, the above-mentioned problems is less likely to occur. Since the unentangled portions are arranged in a balanced manner, when the mat is dried, the drying time tends to be further reduced.

(7) The inorganic fiber forming the mat of the first embodiment of the present invention is formed of at least one kind of inorganic fiber selected from the group consisting of an alumina fiber, an alumina-silica fiber, a silica fiber, a soluble fiber, and a glass fiber, which are superior in characteristics such as heat resistance.

For this reason, the mat and the holding sealing material using the mat are superior in heat resistance, holding force, and the like.

In the case where an inorganic fiber forming a mat is a soluble fiber, the fibers are dissolved and eliminated from the body if the soluble fibers are scattered and introduced into the body during handling the mat. Therefore, the soluble fiber is superior in safety for the body.

(8) In the case where an organic binder is contained in the mat of the first embodiment of the present invention, the following effect can be exerted.

When using the holding sealing material using the mat containing the organic binder in the apparatus for purifying exhaust gas, the organic binder is decomposed by high-temperature exhaust gases during use of the apparatus for purifying exhaust gas, and the adhesion of the inorganic fibers is removed to expand the holding sealing material, and therefore the holding sealing material tends to exert a high holding force.

(9) According to the method for manufacturing a mat of the first embodiment of the present invention, it is possible to desirably manufacture the mat of the present embodiment, having the above-mentioned structure and effect.

(10) Since the apparatus for purifying exhaust gas of the first embodiment of the present invention is provided with a given exhaust gas treating body, PM in the exhaust gases, harmful gases and the like tends to be removed.

Further, since the mat low in the manufacturing cost of the present embodiment is used for the holding sealing material forming the apparatus for purifying exhaust gas, the manufacturing cost of the apparatus for purifying exhaust gas tends to be low.

EXAMPLES

Example 1

The mat of the present embodiment was manufactured through the following processes (1) to (3).
(1) Barb Needling A precursor sheet containing alumina-silica fiber precursors (average fiber length: 100 mm, average fiber diameter: 7 μm, compounding ratio in fired inorganic fibers: $Al_2O_3$:$SiO_2$=72:28 (weight ratio)) which was manufactured by the cross-layer method was prepared.

The precursor sheet had a size of 150 mm in length×150 mm in width×12 mm in thickness, and a weight per unit area of 1160 g/m$^2$.

In addition, a barb needling device which had substantially the same structure as the barbless needling device shown in FIG. 2A, and was provided with a barb needle plate instead of a barbless needle plate was prepared. Barb needles having a diameter of about 2 mm was attached to the barb needle plate at predetermined intervals. The number of barb needle per unit area of the opposite face of the barb needle plate was 3.5 pcs/cm$^2$.

The precursor sheet was placed on a mounting face of a supporting plate so that the mounting face comes into contact with a second principal face of the precursor sheet, a barb needle plate positioned above the supporting plate and the precursor sheet was allowed to descend along the thickness direction of the precursor sheet, and thus a plurality of barb needles were allowed to penetrate from a first principal face side to the second principal face side. Then, by pulling the barb needles out of the precursor sheet, barb needling of the first time was carried out.

Continuously, the barb needling of the second time was carried out.

The precursor sheet on which the barb needling of the first time was carried out, was placed on the mounting face so that the mounting face of the supporting plate came in contact with the first principal face of the precursor sheet.

The barb needle plate positioned above the supporting plate and the precursor sheet was allowed to descend along the thickness direction of the precursor sheet, and thus a plurality of barb needles were allowed to penetrate from the second principal face side to the first principal face side. At this time, the barb needle was allowed to penetrate the precursor sheet so that portions where the barb needle of the first time penetrated and positions where the barb needle of the second time penetrated were alternated and differed from each other.

Then, by pulling the barb needles out of the precursor sheet, a needling precursor sheet was manufactured.
(2) Firing Successively, the needling precursor sheet was fired at a maximum temperature of 1250° C. to convert inorganic fiber precursors into inorganic fibers so that a sheet was manufactured.

The manufactured sheet was formed by entangling alumina-silica fibers with one another, and had a size of 150 mm in length×150 mm in width×12 mm in thickness, and a weight per unit area of 1160 g/m$^2$.
(3) Barbless Needling A barbless needling device having a structure schematically shown in FIG. 2A was prepared.

Barbless needles having a diameter of about 2 mm was attached to the barbless needle plate at predetermined intervals. The number of barbless needle per unit area of the opposite face of the barbless needle plate was 0.5 pcs/cm$^2$.

The sheet manufactured in the process (2) was placed on the mounting face of the supporting plate in the barbless needling device so that the mounting face came into contact with the second principal face of the sheet, a barbless needle plate positioned above the supporting plate and the sheet was allowed to descend along the thickness direction of the sheet, and thus a plurality of barbless needles were allowed to penetrate from the first principal face side to the second principal face side. At this time, the barbless needle is allowed to penetrate the sheet so that a portion where the barb needle of the first time penetrated, a position where the barb needle of the second time penetrated, and a portion where the barbless needle penetrates were alternated and differed from each other on a part of the sheet. Then the barbless needle was pulled out from the sheet.

The mat of the present embodiment was manufactured through the barbless needling.

The manufactured mat was formed by entangling alumina-silica fibers with one another, and had a size of 150 mm in length×150 mm in width×12 mm in thickness, and a weight per unit area of 1160 g/m².

The manufactured mat had unentangled portions provided from first barbless needle through points to second barbless needle through points.

In addition, the mat had first entangled portions provided from first barb needle through points to second barb needle through points, and second entangled portions provided from third barb needle through points to fourth barb needle through points.

A cut piece having a size of 50 mm in length×50 mm in width was manufactured from the manufactured mat, and the cut piece was cut into two substantially equal portions at the center of its thickness direction along a plain substantially parallel to the first and second principal faces. The obtained main cross-sectional face was observed under a microscope, and the formation density of the unentangled portion, and the total formation density of the first and second entangled portions were determined.

As a result, the formation density of the unentangled portions was 0.5 pcs/cm², and the total formation density of the first and second entangled portions was 7 pcs/cm².

The shortest distance between one first (second) barbless needle through point and the other first (second) barbless needle through points most close to the first (second) barbless needle through point is about 12 mm, the shortest distance between a first (second) barb needle through point and a third (forth) barb needle through point most close to the first (second) barb needle through point is about 3 mm, and the shortest distance between the first (second) barbless needle through point and the first or third (second or forth) barb needle through point most close to the first (second) barbless needle through point is about 1.5 mm.

The unentangled portions and the first and second entangled portions were alternately formed at different positions on a part of the mat, like a pattern shown in FIGS. 3A and 3B.

The diameters of the first and second barbless needle through points are about 1 mm, and the diameters of the first to fourth barb needle through points were about 1 mm.

(Cross-sectional Face Observation Test)

In order to confirm the condition of the unentangled portions and the entangled portions, a sample mat for cross-sectional face observation test was manufactured in the same manner as in Example 1. However, in order to make it easy to observe the conditions of the unentangled portions and the entangled portions, the formation density of the unentangled portion was changed to 10 pcs/cm², the formation density of the entangled portion was changed to 7 pcs/cm², the barb needling of the first time was only carried out, and the barb needling of the second time was not carried out.

The manufactured sample mat was cut substantially along the thickness direction and perpendicularly to the principal face so that the unentangled portions and the entangled portions can be seen on the cut face. The cut face magnified 25 times was observed under a microscope. A microscope photograph taken in observation is shown in FIG. 4.

As a result, in the unentangled portion, most inorganic fiber precursors were oriented along a direction substantially parallel to the first and second principal faces, were not entangled with one another, and were parallel to one another.

In the entangled points (unformed region), most inorganic fiber precursors were oriented along a direction substantially parallel to the first and second principal faces, and loosely entangled with one another.

In the entangled portion, while the inorganic fibers were oriented towards the second principal face, the inorganic fibers are closely entangled with one another.

(Drying Test)

The drying test was carried out by the following procedures.

The mat manufactured in Example 1 was used as a sample for drying examination.

In addition, there was prepared a hot-air drying apparatus which was schematically shown in FIG. 8, attached to the end of a piston, and provided with an upper press plate mad of punching metal, a lower press plate opposite to the upper press plate and mad of punching metal, and a hot-air outlet.

The hot-air drying apparatus was placed inside a drying oven in which the inner temperature can be controlled within a predetermined temperature range.

The manufactured sample for drying test was then impregnated with water simulating an organic binder solution to manufacture an impregnated sample. The amount of impregnated water was twice heavier than the dry weight of the sample for drying test (dry weight of the impregnated sample).

The impregnated sample manufactured was placed between the upper and lower press plates of the hot-air drying apparatus.

At this time, the impregnated sample was placed so that both of the principal faces of the impregnated sample each came in contact with the upper and lower press plates.

The upper press plate was then moved in a downward direction, and the impregnated sample was compressed to the thickness of 6 mm.

The temperature of the drying oven was raised to 140° C., and then hot air at 140° C. from the hot-air outlet was sprayed on the impregnated sample to dry the impregnated sample. The weight of the impregnated sample was measured as needed, and the time required for the amount of moisture contained in the impregnated sample to be 5% by weight was determined. The time was defined as drying time.

As a result, the drying time of the sample manufactured in Example 1 was 245 seconds.

(Face Pressure Test)

A face pressure measuring device used in the face pressure test will be described.

The face pressure measuring device includes lower and upper plate members made of metal, between which a sample for face pressure test can be sandwiched from upward and downward directions, a piston which is connected to the upper face of the upper plate member and is movable in the upward and downward directions, and a sensor which can measure a pressure to be applied to the upper plate member (hereinafter, referred to as a face pressure).

Using the face pressure measuring device having this kind of structure, a principle for measurement of face pressure will be described.

The sample for face pressure test is sandwiched between the upper and lower plate members. When the piston then moves in a downward direction, the upper plate member moves in the downward direction, and the sample for face pressure test is compressed to a predetermined compression density. At this time, since the sample for face pressure test tries to return from a compression state to the original state by the repulsive force, a pressure is applied by the repulsive force of the sample for face pressure test. When the pressure is measured by the sensor, the face pressure under compression can be measured.

The face pressure test was carried out by the following procedures.

First, the mat manufactured in Example 1 was cut into a size of 25 mm in width×25 mm in length to prepare a sample for face pressure test.

The sample for face pressure test was placed between the lower and upper plate members of the face pressure measuring device.

At this time, the sample for face pressure test was placed so that both of the principal faces of the sample each came in contact with the lower and upper plate members.

The upper plate member was then moved in a downward direction, and the sample for face pressure test was compressed to a compression density of 0.35 g/cm³.

The sample for face pressure test was held in this state, and the face pressure was measured under a compression density of 0.35 g/cm³.

As a result, the face pressure of the sample for face pressure test in Example 1 was 174 KPa.

Examples 2 to 7

Mats were manufactured in the same manner as in Example 1, except that the formation density of the unentangled portion was properly changed to 1 pcs/cm² to 25 pcs/cm² shown in the following Table 1 by properly changing the formation density of the barbless needles which were attached to the barbless needle plate in the process (3) of Example 1.

In Examples 2 to 7, the shortest distances between one first (second) barbless needle through point and the other first (second) barbless needle through point most close to the one first (second) barbless needle through point were each about 8.5 mm (Example 2), about 3.3 mm (Example 3), about 3 mm (Example 4), about 2.2 mm (Example 5), about 1.7 mm (Example 6), and about 1.3 mm (Example 7).

The shortest distances between a first (second) barb needle through point and a third (forth) barb needle through point most close to the first (second) barb needle through point were about 3 mm (Examples 2 to 7). The shortest distance between the first (second) barbless needle through point and the first or third (second or forth) barb needle through point most close to the first (second) barbless needle through point were about 1.5 mm (Examples 2 to 7). The diameters of the first and second barbless needle through points were about 1 mm, and the diameters of the first to fourth barb needle through points were about 1 mm (Examples 2 to 7).

Samples for drying test (impregnated samples) and samples for face pressure test were manufactured using the respective mat manufactured in Examples 2 to 7 in the same manner as in Example 1.

Comparative Example 1

The sheet manufactured without the barbless needling process in the process (3) of Example 1 was used as a mat of Comparative Example 1.

In other words, the mat of Comparative Example 1 was the same mat as in Examples 1 to 7 except for not forming the unentangled portions and the first and second barbless needle through points, and has a size of 150 mm in length×150 mm in width×12 mm in thickness, and a weight per unit area of 1160 g/m². In addition, the first entangled portions were formed from the first barb needle through points to the second barb needle through points, and the second entangled portions were formed from the third barb needle through points to the fourth barb needle through points. The total formation density of the first and second entangled portions was 7 pcs/cm².

In Comparative Example 1, the shortest distance between the first (second) barb needle through point and the third (forth) barb needle through point most close to the first (second) barb needle through point was about 3 mm, and the diameter of the first to fourth barb needle through points was about 1 mm.

A sample for drying test (impregnated sample) and a sample for face pressure test were manufactured using the mat manufactured in Comparative Example 1 in the same manner as in Example 1.

Comparative Example 2

The mat having substantially the same structure as in Comparative Example 1 except that the formation density of the entangled portion was 20 pcs/cm² was used as a mat of Comparative Example 2.

In other words, the mat of Comparative Example 2 was the same mat as in Examples 1 to 7 except that the unentangled portions and the first and second barbless needle through points were not formed, the formation density of the entangled portion was higher, the shortest distance between the first (second) barb needle through point and the third (forth) barb needle through point most close to the first (second) barb needle through point was about 1.7 mm, and the size was 150 mm in length×150 mm in width×8 mm in thickness, and the weight per unit area was 1160 g/m².

A Sample for drying test (impregnated sample) and a sample for face pressure test were manufactured using the mat manufactured in Comparative Example 2 in the same manner as in Example 1.

The drying time and face pressure were evaluated by carrying out the drying test and face pressure on test using the samples for drying test (impregnated sample) and the samples for face pressure test in the same manner as in Example 1 on the each of the mats manufactured in Examples 2 to 7 and Comparative Examples 1 and 2.

Figure 10:
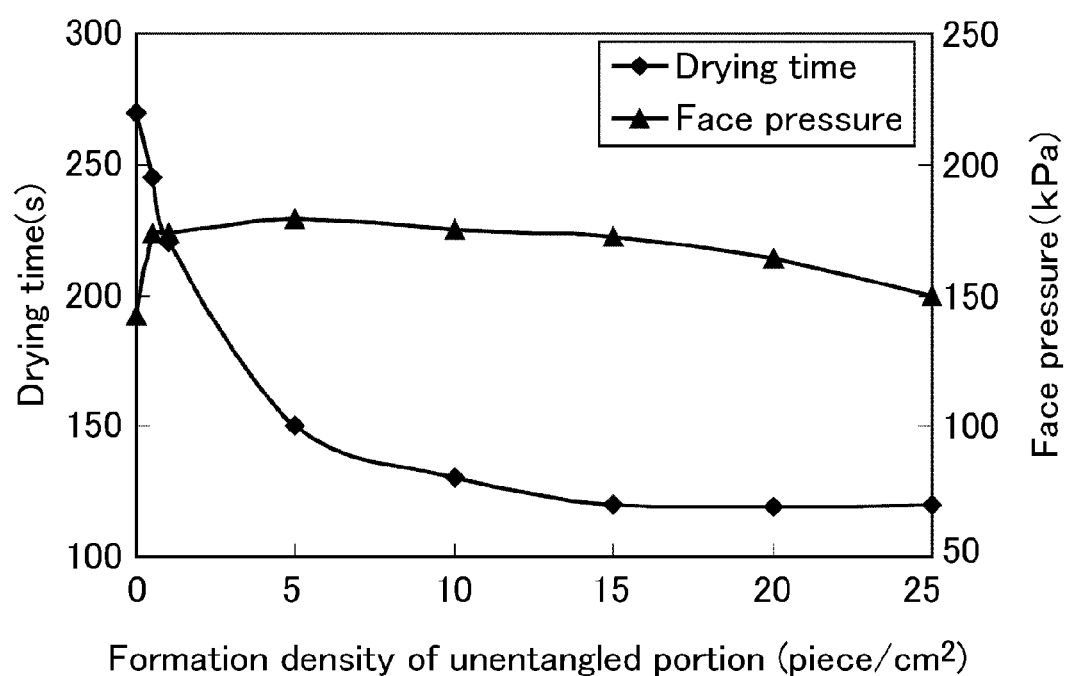
FIG. 10 is a graph that shows a relation between the formation density of the unentangled portion and drying time in Examples 1 to 7 and Comparative Example 1, and a relation between the formation density of the unentangled portion and face pressure in Examples 1 to 7 and Comparative Example 2.

The evaluation results of Examples 2 to 7, and Comparative Examples 1 and 2 are shown in Table 1 together with the evaluation results obtained in Example 1 and FIG. 10.

FIG. 10 is a graph that shows a relation between the formation density of the unentangled portion and drying time in Examples 1 to 7 and Comparative Example 1, and a relation between the formation density of the unentangled portion and face pressure in Examples 1 to 7 and Comparative Example 2.

TABLE 1

| | Formation density of entangled portion (pcs/cm²) | Formation density of unentangled portion (pcs/cm²) | Dry time (s) | Face pressure (kPa) (note 1) |
|---|---|---|---|---|
| Example 1 | 7 | 0.5 | 245 | 174 |
| Example 2 | 7 | 1 | 220 | 174 |
| Example 3 | 7 | 5 | 150 | 179 |
| Example 4 | 7 | 10 | 130 | 175 |
| Example 5 | 7 | 15 | 120 | 172 |
| Example 6 | 7 | 20 | 119 | 164 |
| Example 7 | 7 | 25 | 120 | 150 |
| Comparative Example 1 | 7 | 0 | 270 | 168 |
| Comparative Example 2 | 20 | 0 | 227 | 142 |

(note 1) The sample indicates the face pressure in a state in which the sample is compressed to 0.35 g/cm³.

As shown in Table 1 and the graph of FIG. 10, the drying time of the mats manufactured in Examples 1 to 7 are all reduced than the mat manufactured in Comparative Example 1.

For example, the drying time of the mat of Example 1 in which the total formation density of the first and second entangled portion was 7 pcs/cm², and the formation density of the unentangled portion was 0.5 pcs/cm² was reduced by 25 seconds as compared with the mat of Comparative Example 1 in which the total formation density of the first and second entangled portion was 7 pcs/cm², and the unentangled portion was not formed.

The bulkinesses of the mats manufactured in Examples 1 to 7 were moderately suppressed to a degree necessary for improvement of stuffing property, and has higher face pressure, and repulsive force (holding force) which can surely hold the exhaust gas treating body, as compared with the mat manufactured in Comparative Example 2.

For example, the mat manufactured in Example 5, in which the total formation density of the first and second entangled portions was 7 pcs/cm², the formation density of the unentangled portion was 15 pcs/cm², and the total formation density of the first and second entangled portions and the unentangled portion was 22 pcs/cm², had larger total formation density of the first and second entangled portions and the unentangled portion, and had higher face pressure by 30 kPa, as compared with the mat of Comparative Example 2 in which the total formation density of the first and second entangled portions was 20 pcs/cm². Therefore, it turns out that unlike the case of forming the first and second entangled portions, if the mat is formed of the unentangled portions, the face pressure was not reduced much.

(Second Embodiment)

Referring to drawings, the following description will describe a second embodiment as one of the embodiments of the present invention.

The mat of the second embodiment of the present invention has the same structure as in the above-mentioned mat of the first embodiment of the present invention except that, of the first and second entangled portions described in the first embodiment of the present invention, the second entangled portion is not formed.

Therefore, with respect to the items overlapped with the description of the mat of the first embodiment of the present invention, the description will be omitted.

Figure 11A:
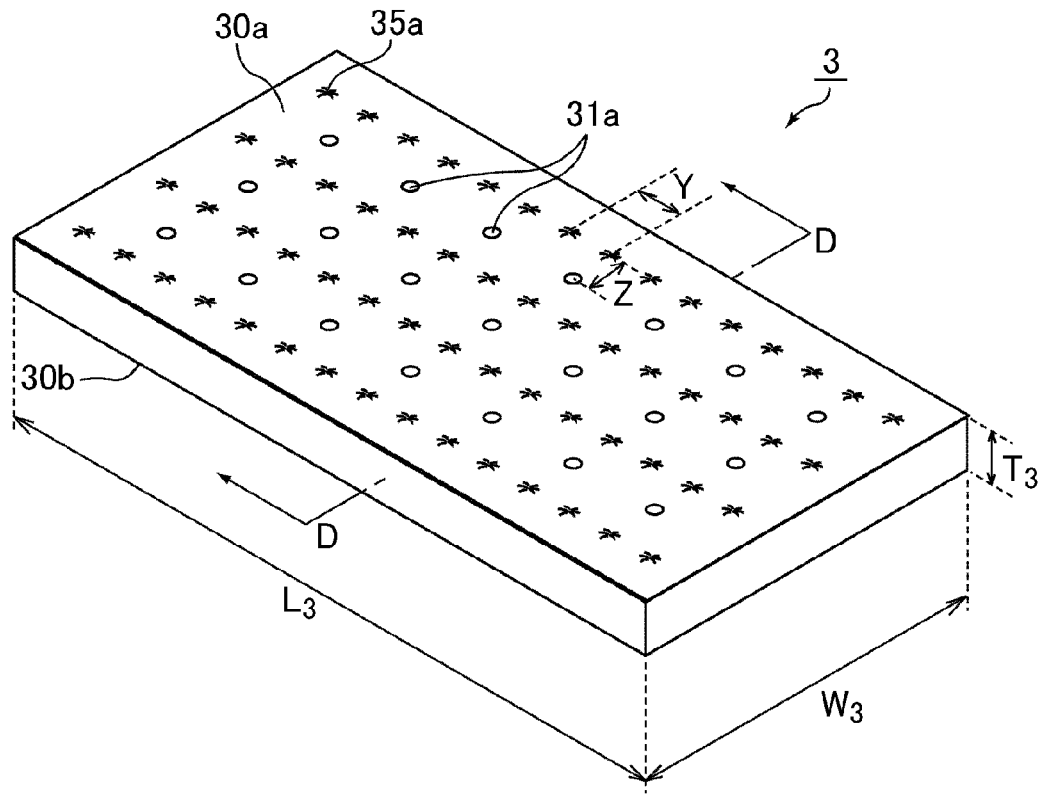
FIG. 11A is a perspective view which schematically shows the mat of a second embodiment of the present invention.
Figure 11B:
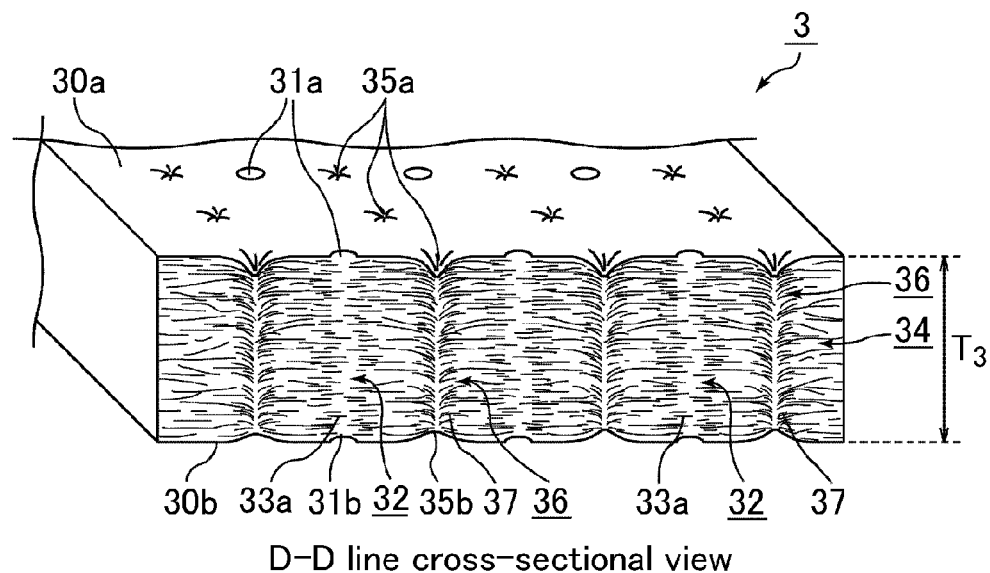
FIG. 11B is a D-D line cross-sectional view of the mat shown in FIG. 11A.

FIG. 11A is a perspective view which schematically shows the mat of a second embodiment of the present invention, and FIG. 11B is a D-D line cross-sectional view of the mat shown in FIG. 11A.

In FIG. 11A, the length, width, and thickness of the mat 3 are shown by double-headed arrows $L_3$, $W_3$, and $T_3$, respectively.

The mat 3 of the present embodiment shown in FIGS. 11A and 11B is a mat which is formed into a substantially rectangular shape in the plan view, having the first principal face 30a and the second principal face 30b opposite to the first principal face 30a, and includes entangled points formed by entangling with one another.

As shown in FIGS. 11A and 11B, a plurality of first barbless needle through points 31a are formed on the substantially whole of the first principal face 30a at predetermined intervals, and a plurality of second barbless needle through points 31b are formed on the substantially whole of the second principal face 30b at predetermined intervals.

The unentangled portions 32 are formed from the first barbless needle through points 31a to the second barbless needle through points 31b. That is, the unentangled portions 32 are formed over the substantially whole of the mat 3 at predetermined intervals.

The unentangled portion 32 includes inorganic fibers 33a which are not entangled with one another and are arranged parallel to one another.

The first barb needle through points 35a are formed on the first principal face 30a, and the second barb needle through points 35b are formed on the second principal face 30b. The entangled portions 36 are formed from the first barb needle through points 35a to the second barb needle through points 35b.

Inorganic fibers 37 forming the entangled portions 36 are oriented to the second principal face 30b side and are closely entangled with one another.

The formation density of the entangled portion 36 is about 0.5 pcs/cm² to about 30 pcs/cm².

The shortest distance between one first barb needle through point 35a (one second barb needle through point 35b) and the other first barb needle through point 35a (the other second barb needle through point 35b) most close to the one first barb needle through point 35a (the one second barb needle through point 35b) (distance shown by a double-headed arrow Y in FIG. 11A) is 1 to 10 mm.

Thus, since the entangled portions 36 are not assembled too tightly, the strength of the mat 3 tends to be sufficiently large.

The diameters of the first barb needle through points 35a and the second barb needle through points 35b are about 0.1 mm to about 2 mm.

Since the diameters of the first barb needle through points 35a and the second barb needle through points 35b are within the above-mentioned range, the diameters of the first barb needle through points 35a and the second barb needle through points 35b are not too large, and the strength of the mat 3 tends to be sufficiently secured.

The shortest distance between one first barbless needle through point 31a (one second barbless needle through point 31b) and one first barb needle through point 35a (the other first barb needle through point 35b) most close to the one first barbless needle through point 31a (the one second barbless needle through point 31b) (distance shown by a double-headed arrow Z in FIG. 11A) is 1 to 10 mm.

Thus, since the unentangled portion 32 and the entangled portions 36 are not assembled too tightly, the strength of the mat 3 tends to be sufficiently large.

As shown in FIGS. 11A and 11B, the unentangled portions 32 and the entangled portions 36 are alternately aligned at substantially equal intervals in a portion where the unentangled portions 32 (the first barbless needle through points 31a and the second barbless needle through points 31b), and the entangled portions 36 (the first barb needle through points 35a and the second barb needle through points 35b) are formed in a row along the width direction $W_3$ of the mat 3, and the unentangled portions 32 and the entangled portions 36 are alternately formed at different positions. The respective entangled portions 36 are aligned at substantially equal intervals in a portion where only the entangled portions 36 are formed in a row along the width direction $W_3$ of the mat 3.

The respective unentangled portions 32 are aligned at substantially equal intervals in a portion where only the unentangled portions 32 are formed in a row along the length direction $L_3$ of the mat 3.

The respective entangled portions 36 are aligned at substantially equal intervals in a portion where only the entangled portions 36 are formed in a row along the length direction $L_3$ of the mat 3.

As described herein, it is preferable that in at least one part of the mat 3, the unentangled portions 32 and the entangled portions 36 are alternately formed at different positions.

The unentangled portions and the entangled portions may be alternately formed at different positions in the whole mat based on the following arrangement. The arrangement is that the unentangled portions and the entangled portions are alternately aligned at substantially equal intervals along the length direction of the mat and the unentangled portions and the entangled portions are alternately aligned at substantially equal intervals along the width direction of the mat.

The total formation density of the unentangled portions 32 and the entangled portions 36 is preferably about 5 pcs/cm² to about 35 pcs/cm². This is because the drying time in the drying process is further reduced and the repulsive force of the mat 3 is not reduced too much.

The following description will describe a method for manufacturing a mat in accordance with the second embodiment of the present invention.

The method for manufacturing a mat of the present embodiment is the same as the above-mentioned method for manufacturing a mat in accordance with the first embodiment of the present invention except that barb needling is carried out on only one principal face of a precursor sheet in the barb needling process.

That is, in the method for manufacturing a mat of the second embodiment of the present invention, the barb needling of the first time may only be carried out to manufacture a needling precursor sheet, and the barb needling of the second time may not be carried out in the process (3) of the method for manufacturing a mat of the first embodiment of the present invention.

A method for manufacturing a binder mat using the mat of the second embodiment of the present invention, a method for manufacturing a holding sealing material using the binder mat, and a method for manufacturing an apparatus for purifying exhaust gas using the manufactured holding sealing material are the same as the respective methods described in the explanation of the first embodiment of the present invention except for using the mat of the present embodiment. Therefore, the explanation of the methods will be omitted.

The mat according to the second embodiment of the present invention, the method for manufacture the mat, and the apparatus for purifying exhaust gas can also exert the functions and effects of the above (1) to (3), and (5) to (10) explained in the first embodiment of the present invention.

(Third Embodiment)

The following description will describe a third embodiment as one of the embodiments of the present invention.

The mat of the third embodiment of the present invention has the same structure as in the above-mentioned mat of the first embodiment of the present invention except that the mat is manufactured using a sheet produced by a sheet-forming process, and the first and second entangled portions and the first to forth barb needle through points are not formed. Therefore, with respect to the items overlapped with those of the first embodiment of the present invention, the description will be omitted.

That is, the mat of the third embodiment of the present invention is a mat that is formed into a substantially rectangular shape in the plan view with the first principal face and the second principal face opposite to the first principal face, and includes entangled points having inorganic fibers being entangled with one another.

In the mat of the third embodiment of the present invention, unentangled portions provided from a plurality of first barbless needle through points on the first principal face to a plurality of second barbless needle through points on the second principal face are formed, and in the unentangled portion, inorganic fibers which are not entangled with one another and is arranged parallel to one another are present.

The following description will describe a method for manufacturing a mat in accordance with the present embodiment.

Here, the description will discuss a method for manufacturing a mat containing alumina-silica fibers. However, inorganic fibers forming the mat of the present embodiment is not limited to the alumina-silica fiber, and inorganic fibers having various compositions such as the above-mentioned alumina fibers may be used.

(1) Preparation of Mixed Solution

Bulk alumina-silica fibers, an organic binder, an inorganic binder, and water are mixed so that the content of the alumina-silica fibers in a raw material liquid is a predetermined value, and stirred by an agitator to prepare a mixed solution.

(2) Sheet Forming

Next, the mixed solution is poured into a forming tub having a mesh for filtration at the bottom face, and the mixed solution is dehydrated through the mesh to manufacture a sheet.

In the sheet forming process, the slender inorganic fibers are subjected to resistance due to the flow of the mixed solution under dehydration, and are more likely to be aligned in a predetermined direction. Therefore, most inorganic fibers are oriented along a direction substantially parallel to the first and second principal faces of the mat, and loosely entangled with one another.

(3) Barbless Needling

Next, the sheet manufactured in the process (2) is provided to a barbless needling, to manufacture a wet mat having unentangled portions.

In the barbless needling process, for example, barbless needling may be carried out using the barbless needling device shown in FIG. 2A in accordance with the method of barbless needling of the first embodiment of the present invention.

That is, barbless needling may be carried out using a sheet manufactured by the sheet-forming method instead of the sheet used in barbless needling of the first embodiment of the present invention.

When the sheet is provided to the sheet-forming process, followed by the barbless needling process before drying, the sheet contains a dispersion medium (water, etc.) brought from the mixed solution in a weight one to five times more than the dry weight of dried sheet.

(4) Heat Compression

The wet mat manufactured in the process (3) is heat-compressed using a heat-compression drying apparatus under a predetermined condition to manufacture a mat.

After this process, alumina-silica fibers are bond to one another by an organic binder and an inorganic binder, and the shape of the mat is held.

In the case where the binder mat is manufactured using the mat of the present embodiment manufactured through the processed (1) to (4), the mat may be provided to binder imparting process (6) described in the first embodiment of present invention.

In the case where the holding sealing material is manufactured using the binder mat manufactured in the binder imparting process, the manufactured mat may be provided to the binder mat cutting process (7) described in the first embodiment of the present invention.

In the case where the apparatus for purifying exhaust gas is manufactured using the holding sealing material manufactured in the cutting process, the manufactured holding sealing material may be provided to the stuffing process (8) described in the first embodiment of the present invention.

The mat according to the third embodiment of the present invention, the method for manufacture the mat, and the apparatus for purifying exhaust gas can also exert the functions and effects of the above (1), (2), and (7) to (10) explained in the first embodiment of the present invention.

The following description will describe examples that more specifically disclose one embodiment of the present invention; however, the present embodiment is not intended to be limited to only these Examples.

Example 8

Manufacture of Holding Sealing Material

The holding sealing material was manufactured by the following procedures.
(1) Preparation of Mixed Solution 27.9 g of bulk alumina-silica fibers (average fiber length: 10 mm, average fiber diameter: 5 μm) having a composition of alumina:silica=72:28 (weight ratio), 3.5 g of acrylic latex, 1 g of alumina sol, and water were mixed so that the content of the alumina-silica fibers in a raw material liquid was 0.5% by weight, and stirred for 300 seconds by an agitator to prepare a mixed solution.
(2) Sheet Forming Next, the mixed solution was poured into a forming tub (150 mm in length×150 mm in width×400 mm in depth) having a mesh for filtration at the bottom face, and the mixed solution was dehydrated through the mesh to manufacture a sheet.

The sheet contained a dispersion medium (water) in the mixed solution in a weight four times more than the dry weight of dried sheet.
(3) Barbless Needling A barbless needling device having a structure schematically shown in FIG. 2A was prepared. As the barbless needle plate, a barbless needle plate having the same structure as the barbless needle plate used in Example 1 was used.

The sheet was placed on a mounting face of a supporting plate in the barbless needling device so that the mounting face came into contact with the second principal face (lower principal face) of the sheet, then a barbless needle plate positioned above the supporting plate and the sheet was allowed to descend along the thickness direction of the sheet, and thus a plurality of barbless needles were allowed to penetrate from the first principal face (upper principal face) side to the second principal face side.

Thereafter, the barbless needles were pulled out from the sheet to manufacture a wet mat.
(4) Heat Compression The manufactured wet mat was taken out from the barbless needling device, and heat-compressed at 120° C. for 30 minutes in the heat-compression drying apparatus to manufacture a mat.

The manufactured mat had a size of 150 mm in length×150 mm in width×8 mm in thickness, and a weight per unit area of 1240 g/m².

The first barbless needle through points were formed on the first principal face of the mat, the second barbless needle through points were formed on the second principal face of the mat, and the unentangled portions were formed from the first barbless needle through points to the second barbless needle through points of the mat.

The formation density of the unentangled portion was 0.5 pcs/cm².

The shortest distance between one first barbless needle through point (one second barbless needle through point) and the other first barbless needle through point (the other second barbless needle through point) most close to the one first barbless needle through point (the one second barbless needle through point) of the mat was about 12 mm.

The diameters of the first barbless needle through points and the second barbless needle through points were about 1 mm.

Examples 9 to 14

Mats were manufactured in the same manner as in Example 8, except that the formation density of the unentangled portion was properly changed to 1 pcs/cm² to 25 pcs/cm² shown in the following Table 2 by properly changing the formation density of the barbless needles which were attached to the barbless needle plate in the process (3) of Example 8.

In Examples 9 to 14, the shortest distances between one first (second) barbless needle through point and the other first (second) barbless needle through points most close to the one first (second) barbless needle through point were each about 8.5 mm (Example 9), about 3.3 mm (Example 10), about 3 mm (Example 11), about 2.2 mm (Example 12), about 1.7 mm (Example 13), and about 1.3 mm (Example 14). The diameters of the first and second barbless needle through points were about 1 mm (Examples 9 to 14).

Samples for drying test (impregnated samples) and samples for face pressure test were manufactured using the mat manufactured in Examples 8 to 14 in the same manner as in Example 1.

Comparative Example 3

A mat was manufactured in the same manner as in Example 8 except that the barbless needling process of the process (3) of Example 8 was not carried out.

In other words, the mat of Comparative Example 3 was the same mat as in Examples 8 to 14 except for not forming the unentangled portions and the first and second barbless needle through points, and had a size of 150 mm in length×150 mm in width×8 mm in thickness, and a weight per unit area of 1240 g/m².

A sample for drying test (impregnated sample) and a sample for face pressure test were manufactured using the mat manufactured in Comparative Example 3 in the same manner as in Example 1.

The drying time were evaluated by carrying out the drying test using the respective samples for drying test (impregnated samples) of Examples 8 to 14 and Comparative Example 3 in the same manner as in Example 1. The manufactured samples for drying test (impregnated samples) were impregnated with water in a weight four times more than the dry weight of the respective samples to carry out the drying test.

The face pressure was evaluated by carrying out the face pressure using the samples for face pressure test of Examples 8 to 14 and Comparative Example 3 in the same manner as in Example 1.

Figure 12:
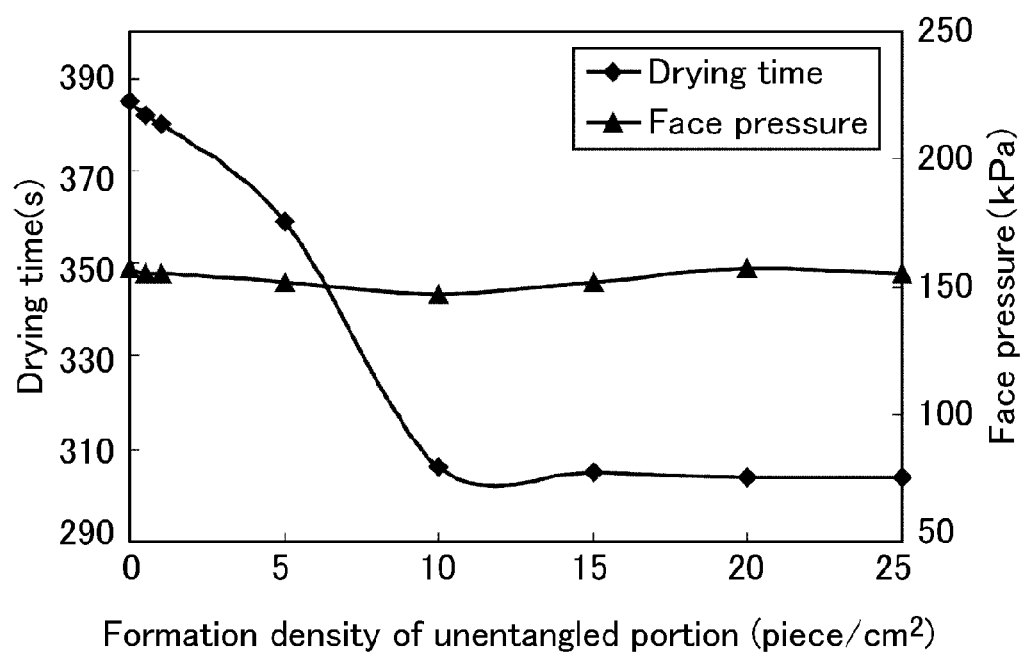
FIG. 12 is a graph that shows a relation between the formation density of the unentangled portion and drying time and a relation between the formation density of the unentangled portion and face pressure in Examples 8 to 14 and Comparative Example 3.

The evaluation results of Examples 8 to 14, and Comparative Example 3 are shown in Table 2 and FIG. 12.

FIG. 12 is a graph that shows a relation between the formation density of the unentangled portion and drying time and a relation between the formation density of the unentangled portion and face pressure in Examples 8 to 14 and Comparative Example 3.

TABLE 2

| | Formation density of unentangled portion (pcs/cm²) | Dry time (s) | Face pressure (kPa) (note 1) |
|---|---|---|---|
| Example 8 | 0.5 | 382 | 155 |
| Example 9 | 1 | 380 | 155 |
| Example 10 | 5 | 359 | 152 |
| Example 11 | 10 | 306 | 147 |
| Example 12 | 15 | 305 | 152 |
| Example 13 | 20 | 304 | 157 |
| Example 14 | 25 | 304 | 155 |
| Comparative Example 3 | 0 | 385 | 157 |

(note 1) The sample indicates the face pressure in a state in which the sample is compressed to 0.35 g/cm³.

As shown in Table 2 and the graph of FIG. 12, the drying time of the mats manufactured in Examples 8 to 14 are all reduced than the mat manufactured in Comparative Example 3.

The bulkinesses of the mats manufactured in Examples 8 to 14 were moderately suppressed to a degree necessary for improvement of stuffing property, and had comparatively high face pressure, and repulsive force which can surely hold the exhaust gas treating body in the case where the mat is processed into the holding sealing material.

(Other Embodiments)

The mat according to the embodiment of the present invention may further contain an expansive agent.

In the holding sealing material using the mat containing the expansive agent, during use of the apparatus for purifying exhaust gas, the expansive agent is expanded by high-temperature exhaust gases, and therefore the holding sealing material can exert a high holding force.

Examples of the expansive agent include, for example, expanded vermiculite, bentonite, expanded graphite, and the like.

The formation density of the unentangled portions formed in the mat according to the embodiment of the present invention is preferably about 0.5 pcs/cm² to about 25 pcs/cm², more preferably about 1 pcs/cm² to about 20 pcs/cm², even more preferably about 5 pcs/cm² to about 20 pcs/cm², and particularly preferably about 10 pcs/cm² to about 20 pcs/cm².

This is because the drying time tends to be reduced more, while the repulsive force of the mat is maintained within the predetermined range (see FIGS. 10 and 12).

In the mat according to the embodiment of the present invention, the shortest distance between one first barbless needle through point (one second barbless needle through point) and the other first barbless needle through point (the other second barbless needle through point) most close to the one first barbless needle through point (the one second barbless needle through point) is preferably about 1 mm to about 20 mm.

This is because the unentangled portions containing inorganic fibers which are not entangled with one another are not assembled too tightly, and the strength of the mat tends to be sufficiently secured. This is because the distance between the barbless needle through points (unentangled portions) which function as a venting hole is not too long. Therefore when the mat is impregnated, and then dried, the whole mat including entangled points (unformed region) tends to be dried evenly, and the drying time tends to be further reduced.

In contrast, when the shortest distance is less than about 1 mm, the distance between the barbless needle through points (unentangled portion) containing inorganic fibers which are not entangled with one another is too close, and the strength of the mat tends to be reduced.

When the shortest distance is more than about 20 mm, the distance between the barbless needle through points (unentangled portions) is too long. Therefore when the mat is impregnated, and then dried, and the drying time is less likely to be reduced.

The diameters of the first barbless needle through points and the second barbless needle through points in the mat according to the embodiment of the present invention are preferably about 0.1 mm to about 3 mm.

This is because the diameters of the first barbless needle through points and the second barbless needle through points (diameters of the unentangled portions) are not too large, and the strength of the mat tends to be sufficiently secured. This is because the diameters of the first barbless needle through points and the second barbless needle through points (diameters of the unentangled portions) are not too small, and the unentangled portions can exert the function of a venting hole. Therefore when the mat is impregnated and then dried, the whole mat including entangled points (unformed region) can be dried evenly, and the drying time tends to be further reduced.

In contrast, when the diameter is less than about 0.1 mm, the diameters of the first barbless needle through points and the second barbless needle through points (diameters of the unentangled portions) are too small, and the unentangled portions are less likely to function as a venting hole.

When the diameter is more than about 3 mm, the diameters of the first barbless needle through points and the second barbless needle through points (diameters of the unentangled portions) are too large, and the strength of the mat tends to be reduced.

When the entangled portions (first and second entangled portions) are formed in the mat according to the embodiment of the present invention, the formation density of the entangled portions (first and second entangled portions) is preferably about 0.5 pcs/cm² to about 30 pcs/cm², more preferably about 3 pcs/cm² to about 20 pcs/cm², and even more preferably about 5 pcs/cm² to about 10 pcs/cm². This is because the strength of the mat is further increased.

When the unentangled portions and entangled portions are formed in the mat according to the embodiment of the present invention, the total formation density of the unentangled portions and entangled portions is preferably about 5 pcs/cm² to about 35 pcs/cm², more preferably about 5 pcs/cm² to about 30 pcs/cm², even more preferably about 10 pcs/cm² to about 30 pcs/cm², and particularly preferably about 15 pcs/cm² to about 30 pcs/cm².

This is because the drying time in the drying process is further reduced and the repulsive force of the mat is less likely to be reduced. It is preferable that the unentangled portions and the entangled portions are alternately formed at different positions.

In the mat according to the embodiment of the present invention, the unentangled portions may be formed over the substantially whole of the mat at predetermined intervals, as described in the first to third embodiments, or a high-density region where the formation density of the unentangled portion is locally larger than that of the other region may be provided in a part of the mat. In the high density region, since more inorganic fibers which are not entangled with one another are present than the other region, the mat partially provided with the high density region tends to be bent around the high density region as if a perforation is provided.

In the case where the holding sealing material 200 shown in FIG. 5 is manufactured from the mat according to the embodiment of the present invention, it is preferable that the high density region extends like a belt or line along the particular direction of the mat (for example, the width direction of the mat). One of the embodiments is that the high density region extends along the width direction W' of the holding sealing material 200 from one end face parallel to the length direction L' to the other end face parallel to the length direction L' like a belt or line.

The holding sealing material using the mat of this kind tends to be bent so that flat end faces parallel to the width direction (in FIG. 5, the end faces parallel to the width direction are represented by 233a and 233b) come in contact with each other easily, and tends to wrap around the exhaust gas treating body easily. As a round pillar shaped exhaust gas treating body, in the case where the shape of the cross-sectional face perpendicular to the longitudinal direction of the exhaust gas treating body is circle, the functions and effects can be suitably obtained. In the case where the exhaust gas treating body in which the shape of the cross-sectional face is oval, ellipse, racetrack-shaped, a shape (concave-shaped) having a recessed portion on a part of simple closed curve which is oval or ellipse or the like, is used, the functions and effects can be suitably obtained as well. In this case, the high density region is preferably provided at a portion to where a portion having a small curvature in the cross-sectional face shape is contacted.

In the method for manufacturing a mat according to the embodiment of the present invention, in the case where the unentangled portion and the entangled portion are manufactured, the mat may be manufactured through the following processes, in addition to the methods described in the first and second embodiments.

A precursor sheet including an inorganic fibers precursor which are closely entangled with one another was manufactured in the same processes as in the spinning process (1) to the compressing process (2).

(3) Firing

The manufactured precursor sheet was fired at a maximum temperature of about 1000° C. to about 1600° C. to convert an inorganic fiber precursor into inorganic fibers to manufacture a sheet.

(4) Barbless Needling

The barbless needling is carried out using the sheet manufactured in the process (3) of this embodiment in accordance with the method described in the first embodiment of the present invention. That is, the barbless needling carried out using the sheet manufactured in the process (3) of this embodiment may be used instead of the sheet (needling sheet) used in the first embodiment of the present invention.

Thus, barbless needling sheet forming the unentangled portion is manufactured.

(5) Barb Needling

The barb needling is carried out using the barbless needling sheet manufactured in the process (4) of this embodiment in accordance with the method described in the first embodiment of the present invention. That is, the barb needling carried out using the barbless needling sheet manufactured in the process (4) of this embodiment may be used instead of the precursor sheet used in the first embodiment of the present invention.

According to this method also, the mat according to the embodiment of the present invention can be preferably manufactured.

In barb needling, barb needling may be carried out on both of the principal faces of the barbless needling sheet to manufacture a mat including the unentangled portions and the first and second entangled portions, or barb needling may be carried out on one of the principal faces of the barbless needling sheet to manufacture a mat including the unentangled portions and the first entangled portion.

In the method for manufacturing a mat according to the embodiment of the invention, in the case where the mat including the unentangled portion and the entangled portion are manufactured, one needling including barb needling and barbless needling is preferably carried out.

In this case, for example, the barbless needling device shown in FIG. 2A is prepared, instead the barbless needle plate, the needling device including a mixed needle plate to which the barb needles and barbless needle are attached at predetermined intervals is used.

This needling device is used to carry out the same treatment for the precursor sheet as the barb needling described in the first and second embodiments of the present invention. The barb needling and the barbless needling can be carried out simultaneously through one needling.

The processed sheet is provided to the same firing process as the process (4) described in the first embodiment of the present invention to convert the inorganic fiber precursors into inorganic fibers, and the mat according to the embodiment of the present invention can be manufactured.

According to this method for manufacturing a mat, the pitch of the unentangled portion and entangled portion tend to be controlled to even values as being designed values, as compared with the process in which the barb needling and barbless needling are separately carried out. Since the mat according to the embodiment of the present invention can be manufactured by the needling of one time, the manufacturing efficiency of the mat can be further increased.

In a method for manufacturing the mat according to the embodiment of the present invention, the shape of a barb formed on the barb needle is not limited to the above-mentioned shape that protrudes in the direction to the tip direction of the needle, as long as it can form the entangled inorganic fibers. For example, a shape that protrudes in the direction to the root of the needle may be used.

In the method for manufacturing the mat member according to the embodiment of the present invention, the inorganic compound contained in a spinning mixture used for manufacturing the inorganic fiber precursors which are converted into alumina fibers after firing is not particularly limited to the above-mentioned basic aluminum chloride, and any inorganic compound may be used as long as it is converted into alumina after the firing. Examples of the inorganic compound that is converted into alumina after the firing include basic aluminum acetate, aluminum oxychloride, and the like.

Although not particularly limited, examples of the organic polymer to be added to the spinning mixture include a water-soluble organic polymer, such as polyethylene oxide, hydroxyethyl cellulose, hydroxymethyl cellulose, carboxymethyl cellulose, polyethylene glycol, and sodium polyacrylate, in addition to the above-mentioned polyvinyl alcohol.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An apparatus for purifying exhaust gas comprising:
an exhaust gas treating body;
a casing supporting said exhaust gas treating body; and
a holding sealing material placed between said exhaust gas treating body and said casing,
wherein said holding sealing material uses a mat comprising:

a first principal face;

a second principal face opposite to the first principal face:

an organic binder;

entangled points provided by entangling inorganic fibers with one another;

entangled portions provided from said first principal face to said second principal face, the entangled portions being formed by inserting barbed needles into the mat to entangle the inorganic fibers within the mat, a thickness of the mat at the entangled portions is thinner than a thickness of the mat at a portion other than the entannled portions: and unentangled portions provided from the first principal face to the second principal face, the unentangled portions being formed by inserting barbless needles into the mat to form venting holes, the inorganic fibers being, not entangled with one another and being arranged substantially parallel to one another in said unentangled portions, wherein inorganic fibers forming said entangled portions are closely entangled with one another as compared with inorganic fibers forming a portion other than the entangled portions, and wherein most of said inorganic fibers are oriented along the direction substantially parallel to the first principal face and the second principal face in the entangled points except for said entanaled portions.

2. The apparatus according to claim 1,
wherein at least one of said unentangled portions is provided by penetrating the barbless needles to a first sheet which is to be the mat from a first principal face side to a second principal face side or from the second principal face side to the first principal face side.

3. The apparatus according to claim 1,
wherein said unentangled portions have a formation density of about 0.5 pcs/cm$^2$ to about 25 pcs/cm$^2$.

4. The apparatus according to claim 3,
wherein said unentangled portions have a formation density of about 1 pcs/cm$^2$ to about 20 pcs/cm$^2$.

5. The apparatus according to claim 1,
wherein said entangled portions comprise
  a first entangled portion which is provided using the inorganic fibers closely entangled with one another while the first entangled portion is oriented from a first principal face side of the mat to a second principal face side, and
  a second entangled portion which is provided using the inorganic fibers closely entangled with one another while the second entangled portion is oriented from the second principal face side of the mat to the first principal face side.

6. The apparatus according to claim 1,
wherein said entangled portions have a formation density of about 0.5 pcs/cm$^2$ to about 30 pcs/cm$^2$.

7. The apparatus according to claim 1,
wherein said unentangled portions and said entangled portions are alternately formed at different positions.

8. The apparatus according to claim 1,
wherein said inorganic fibers comprise at least one of an alumina fiber, an alumina-silica fiber, a silica fiber, a soluble fiber, and a glass fiber.

9. The apparatus according to claim 8,
wherein a composition ratio of the alumina-silica fiber is $Al_2O_3:SiO_2$ of (about 60: about 40) to (about 80: about 20) in an weight: ratio.

10. The apparatus according to claim 1, wherein the mat further comprises:
an expansive agent.

* * * * *